US009087450B2

(12) United States Patent
Hedrick et al.

(10) Patent No.: US 9,087,450 B2
(45) Date of Patent: Jul. 21, 2015

(54) UPGRADED FLIGHT MANAGEMENT SYSTEM AND METHOD OF PROVIDING THE SAME

(75) Inventors: Geoffrey S. M. Hedrick, Malvern, PA (US); Shahram Askarpour, Media, PA (US); Markus Knopf, Chester Springs, PA (US)

(73) Assignee: Innovative Solutions and Support, Inc., Exton, PA (US)

( * ) Notice: Subject to any disclaimer, the term of this patent is extended or adjusted under 35 U.S.C. 154(b) by 888 days.

(21) Appl. No.: 13/109,747

(22) Filed: May 17, 2011

(65) Prior Publication Data

US 2012/0296496 A1 Nov. 22, 2012

(51) Int. Cl.
*G05D 1/00* (2006.01)
*G06F 9/44* (2006.01)
*G08G 5/00* (2006.01)

(52) U.S. Cl.
CPC ............ *G08G 5/0021* (2013.01); *G08G 5/0034* (2013.01)

(58) Field of Classification Search
CPC ......... G01C 23/00; G01C 23/005; G01D 7/02
USPC ............................................................ 701/3
See application file for complete search history.

(56) References Cited

U.S. PATENT DOCUMENTS

| 5,121,325 | A | 6/1992 | DeJonge |
| 5,408,413 | A | 4/1995 | Gonser et al. |
| 6,308,116 | B1 | 10/2001 | Ricks et al. |
| 6,405,107 | B1 | 6/2002 | Derman |
| 6,507,782 | B1 | 1/2003 | Rumbo et al. |
| 6,571,155 | B2 | 5/2003 | Carriker et al. |
| 6,654,685 | B2 | 11/2003 | McIntyre |
| 2007/0046680 | A1* | 3/2007 | Hedrick et al. ............... 345/503 |
| 2008/0140270 | A1 | 6/2008 | Davis et al. |
| 2010/0114407 | A1 | 5/2010 | Klooster et al. |
| 2010/0131125 | A1 | 5/2010 | Blanchon et al. |
| 2010/0169014 | A1 | 7/2010 | Huynh et al. |
| 2011/0118908 | A1* | 5/2011 | Boorman et al. ............... 701/14 |

* cited by examiner

*Primary Examiner* — John Q Nguyen
*Assistant Examiner* — Kyung Kim
(74) *Attorney, Agent, or Firm* — Bryan Cave LLP

(57) ABSTRACT

A preexisting FMS system may be upgraded to increase its functionality while still taking advantage of certain components of the legacy system previously provided on the aircraft and replacing other preexisting components with different components for enhancing the functionality of the FMS system. The preexisting IRU, CADC, DME receiver and DFGC in the upgraded FMS system are in communication with the legacy AFMC but, instead of employing the legacy EFIS which existed in the prrexisting FMS system, the EFIS is replaced by a data concentrator unit as well as the display control panel and integrated flat panel display, and a GPS receiver. The upgraded FMS system is capable of such increased functionality as increased navigation database storage capacity, RNP, VNAV and RNAV capability utilizing a GPS based navigation solution, and RTA capability, while still enabling the legacy AFMC to exploit its aircraft performance capabilities throughout the flight.

18 Claims, 20 Drawing Sheets

MCDU/FMS SOFTWARE FLOW FOR VERTICAL AND LATERAL NAVIGATION

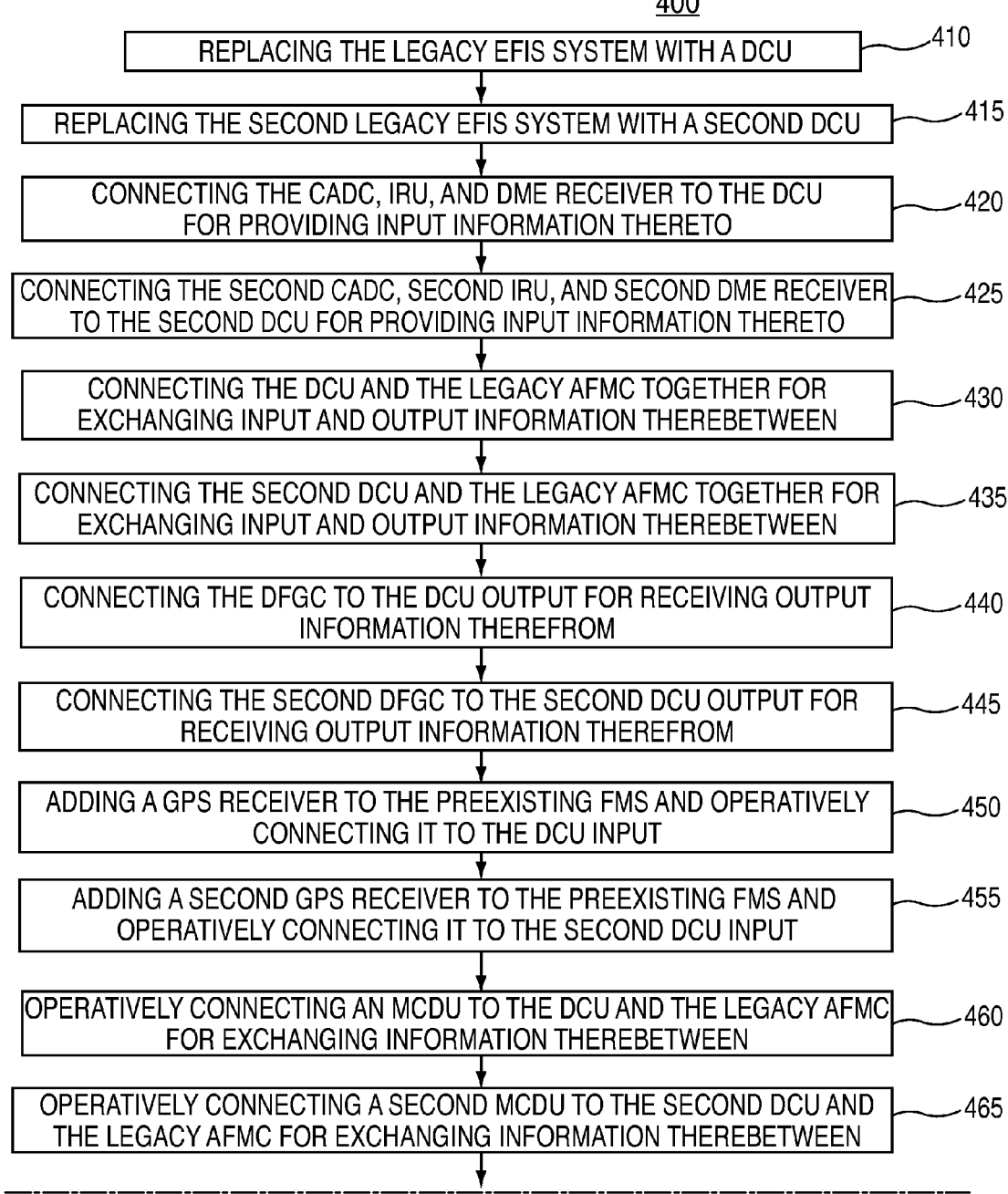

UPGRADED FLIGHT MANAGEMENT SYSTEM AND METHOD OF PROVIDING THE SAME

FIELD OF THE INVENTION

The present invention relates generally to flight management systems ("FMS") for use on board an aircraft, such as for interfacing with the flight crew and assisting in the control of an aircraft throughout flight, and more particularly relates to the upgrading of preexisting flight management systems previously provided on the aircraft in order to update the preexisting FMS to provide increased functionality while attempting to cannibalize and optimize the utilization of various costly components of the preexisting on board flight management system.

BACKGROUND OF THE INVENTION

The longevity of aircraft, particularly aircraft used in commercial aviation, usually far exceeds changes in the level and capabilities of on board equipment used to assist the flight crew in controlling the aircraft. Thus, the aircraft manufacturer, or the customer, such as a commercial airline, in their desire to upgrade their equipment with the latest technology, such as regarding on board flight management systems ("FMS") is faced with considerable expense, and downtime, in attempting to upgrade the existing aircraft with the latest technology. In many instances, particularly regarding commercial aviation, this may not be a mere matter of competitive choice but may be mandated by a regulatory agency, such as the Federal Aviation Administration. In the case of commercial fleets involving substantial numbers of aircraft this can be quite costly and time consuming, but necessary as the cost of the aircraft involved, and the time to construct them, leaves very little choice but to retrofit the existing fleet.

One such area where there have been considerable changes which improve the capability and efficiency of the aircraft is in the area of flight management systems which have now needed to be updated to keep up not only with competitive pressures, but with the latest capabilities and functionality desired by the FAA as well. A typical example of this is with respect to the preexisting flight management system on board a typical conventional MD-80/90 aircraft which is a work horse of many airline fleets and has been utilized by the airlines for many years. Such aircraft, despite their long use, still have many flying hours left but need the preexisting on board flight management system to be replaced or upgraded to keep up with modern needs and requirements. These preexisting systems, such as the preexisting flight management system on board a typical MD-80/90 aircraft, which were satisfactory when they were originally installed on board the aircraft, and have previously been for several years thereafter, generally have a legacy EFIS system which, in today's environment, results in various existing system shortcomings, such as providing limited FMS Navigation database storage capacity, lacking a desired required time of arrival or RTA capability, and lacking the ability to provide RNP VNAV and RNAV capability utilizing a GPS or global positioning system based navigation solution.

Prior art efforts in this area, in order to meet these and other current needs in preexisting aircraft still having considerable life, have involved the often costly and inefficient complete replacement of the preexisting flight management system with an entirely new system. This was the typical approach previously utilized rather than attempting to take advantage of various key legacy components in a retrofitted system, such as by overcoming these preexisting system shortcomings by replacing the legacy EFIS system with other components while optimizing the usage of preexisting legacy components from the prior on board flight management system, such as the legacy advance flight management computer or AFMC which in the navigation solution utilized on preexisting aircraft, such as the MD-80/90, relies on a single AFMC to calculate such parameters as lateral guidance, vertical guidance, and performance calculations. Thus, it would be desirable in any navigation upgrade solution for preexisting aircraft to be able to retain the legacy AFMC in any upgraded navigation solution for that aircraft, rather than replace the preexisting FMS system completely so as to be able, inter alia, to exploit the previously proven performance capabilities of the on board AFMC. In addition, because these preexisting flight management systems were not originally intended to utilize the type of GPS based navigation solutions preferred today, they did not have the capability of utilizing a GPS based navigation solution, such as to provide RNP VNAV and RNAV capability.

Accordingly, a need or potential for benefit exists for viable upgraded flight management systems that can take advantage of and retrofit or cannibalize preexisting on board FMS system components, including the on board AFMC, in order to efficiently and cost effectively upgrade the capabilities of the preexisting FMS system without having to completely replace it.

SUMMARY OF THE INVENTION

In accordance with the present invention, a preexisting flight management system or FMS, such as a legacy MD-80/90 FMS system, is upgraded to increase its functionality while still employing certain preexisting components of the legacy system, such as the advanced flight management computer or AFMC, the inertial reference unit or IRU, the central air data computer or CADC, the distance measuring equipment receiver (DME) receiver, and the digital flight guidance computer or DFGC, while replacing other preexisting components, such as the legacy EFIS system, with different components providing enhanced functionality for the FMS system. In the reconstituted or upgraded flight management system of the present invention, the preexisting IRU, CADC, DME receiver and DFGC remain in communication with the legacy AFMC but, instead of utilizing the legacy electrical flight information system or EFIS system from the preexisting FMS system, the EFIS system is replaced by a data concentrator unit as well as a display control panel and an integrated flat panel display, and a global positioning system or GPS receiver is added to the system to enable a GPS based navigation solution to be provided. The data concentrator unit and the legacy AFMC are operatively connected to each other for exchanging information therebetween, with the DFGC being connected to the data concentrator unit output. The GPS or global positioning system receiver is operatively connected to the data concentrator for providing input information thereto. The upgraded FMS system of the present invention is capable of at least increased navigation database storage capacity and/or required navigation performance (RNP), vertical navigation (VNAV) and area navigation (RNAV) capability utilizing a GPS based navigation solution and may have required time of arrival or RTA capability as well, while still enabling the legacy AFMC to exploit its aircraft performance capabilities throughout the flight of the aircraft which has the upgraded FMS system on board. Like the preexisting flight management system, the upgraded flight management system of the present invention may employ a redundant system connected to the legacy AFMC so that, for example, the pilot and first officer each have a duplicate set of controls. In such an instance, the upgraded system of the present invention would include a second IRU, a second CADC, a second DME receiver, a second DFGC, a second data concentrator unit, and a second global positioning receiver while still utilizing the common legacy AFMC. Thus, as will be explained in greater detail below with reference to the drawings, the upgraded flight management system of the present invention provides a viable and cost effective solution to upgrade a preexisting flight management system while increasing functionality and overcoming shortcomings of the preexisting system, such as, for example, increasing FMS navigation database storage capacity, providing RNP VNAV and RNAV capability utilizing a GPS based navigation solution, and providing required time of arrival or RTA capability.

BRIEF DESCRIPTION OF THE DRAWINGS

To facilitate further description and understanding of the present invention, the following drawings are provided in which.

Figure 1:
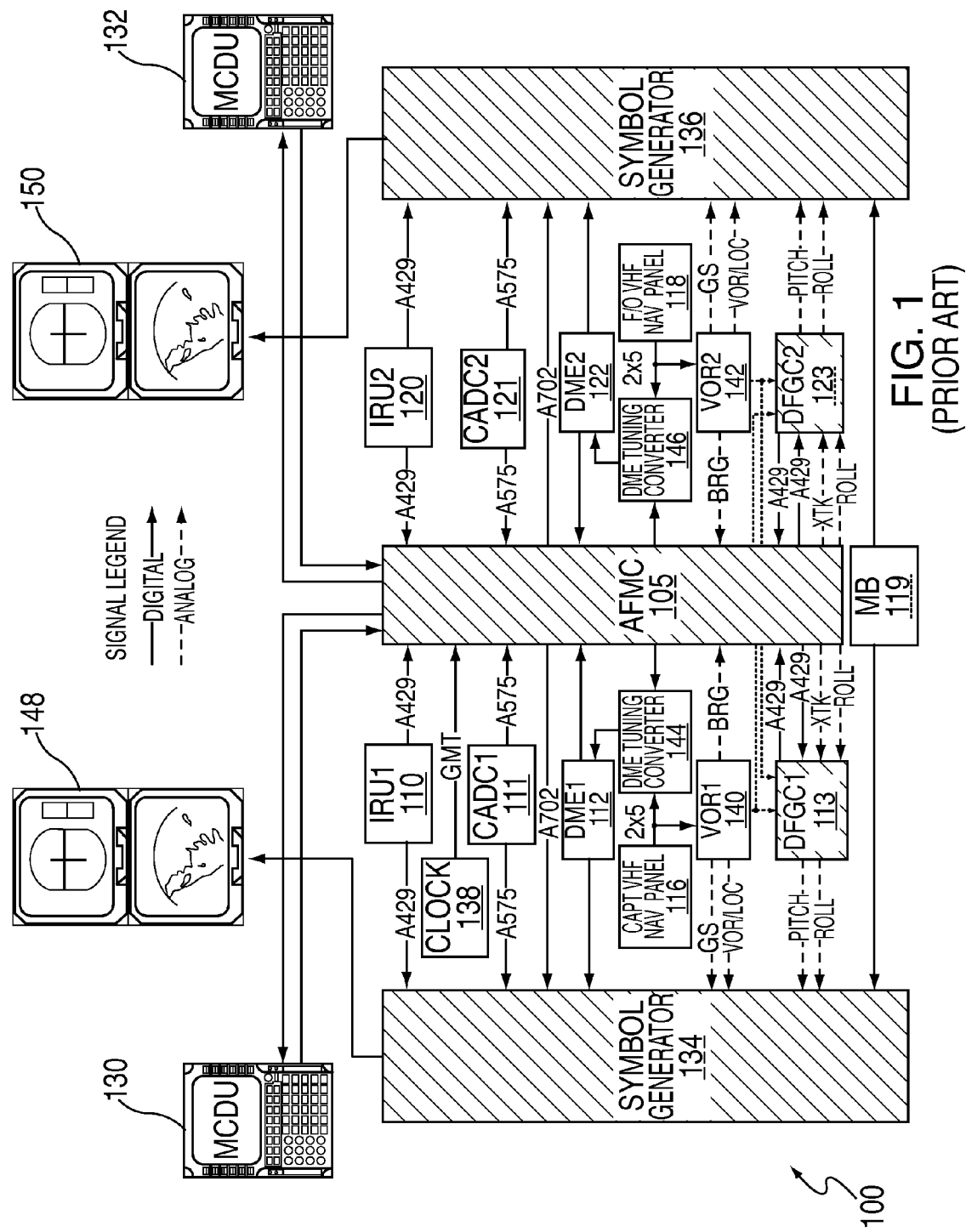
FIG. 1 is a representative block diagram illustrating a typical conventional prior art preexisting legacy flight management system, such as the legacy MD-80/90 Nav System available on a conventional MD-80/90 commercial aircraft.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "connect," "connected," "connects," "connecting," "couple," "coupled," "couples," "coupling," and the like should be broadly understood and refer to linking two or more elements or signals, electrically, mechanically and/or otherwise. Two or more electrical elements may be electrically connected/coupled but not be mechanically or otherwise connected/coupled; two or more mechanical elements may be mechanically connected/coupled, but not be electrically or otherwise connected/coupled; two or more electrical elements may be mechanically connected/coupled, but not be electrically or otherwise connected/coupled. Connecting/coupling may be for any length of time, e.g., permanent or semi-permanent or only for an instant.

"Electrical connecting," "electrical coupling," and the like should be broadly understood and include connecting/coupling involving any electrical signal, whether a power signal, a data signal, and/or other types or combinations of electrical signals. "Mechanical connecting," "mechanical coupling," and the like should be broadly understood and include mechanical connecting/coupling of all types.

The absence of the word "removably," "removable," and the like near the word "connected" and/or "coupled," and the like does not mean that the connecting and/or coupling, etc. in question is or is not removable.

The term "primary" in the description and in the claims, if any, is used for descriptive purposes and not necessarily for describing relative importance. For example, the term "primary" can be used to distinguish between a first component and an equivalent redundant component; however, the term "primary" is not necessarily intended to imply any distinction in importance between the so-called primary component and the redundant component. Unless expressly stated otherwise, any redundant component(s) should be treated as being able to operate interchangeably with any primary component(s) of the system, in tandem with any primary component(s), and/or in reserve for any primary component(s) (e.g., in the event of a component/system failure).

DETAILED DESCRIPTION OF THE PREFERRED EMBODIMENT

Figure 2:
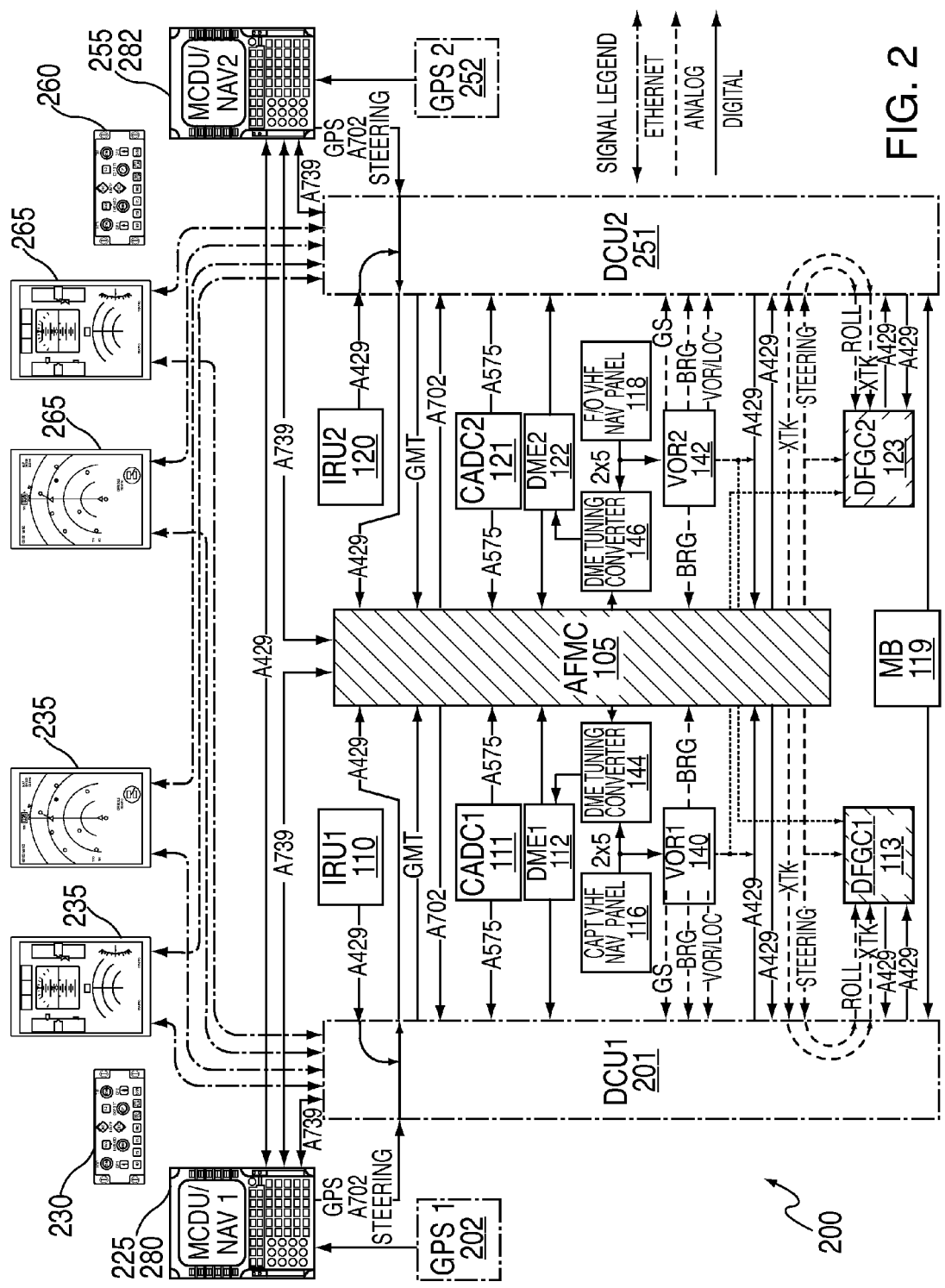
FIG. 2 is a representative block diagram illustrating the upgraded preexisting flight management system, according to the present invention in which the system of FIG. 1 has been upgraded in accordance with the present invention.

Referring now to the drawings in detail, and initially to FIG. 1, it is believed that a brief explanation of FIG. 1, which illustrates a typical prior art legacy MD-80/90 Nav system 100 of the type normally found on board conventional MD-80/90 aircraft, would be helpful in understanding the subsequent explanation of the upgrading of such a legacy system 100 in accordance with the present invention. For purposes of illustration, a presently preferred embodiment of such an upgraded flight management system 200 is illustrated in FIG. 2, with like reference numerals being utilized in FIG. 2 for the preexisting or legacy components of the preexisting flight management system of FIG. 1 which remain after the upgrading of the system of FIG. 1 has taken place in accordance with the present invention. As illustrated in FIG. 1, the prior art or preexisting flight management system 100 which is to be upgraded in accordance with the present invention will be described, by way of example, with reference to a conventional legacy MD-80/90 Nav system of the type normally provided on board preexisting MD-80/90 aircraft provided by the Boeing Company and previously through McDonnell Douglas Corporation now a part of the Boeing Company.

As shown in FIG. 1, the conventional prior art preexisting flight management system or FMS 100 provided on board a typical MD-80/90 aircraft, normally includes redundant systems for the pilot and first officer. The redundant FMS system 100 which preexisting MD-80/90 aircraft are normally equipped with includes two conventional inertial reference units or IRU 110, 120; two conventional very high frequency navigation (VHF NAV) receivers 116, 118; two conventional DME receivers 112, 122; a conventional marker beacon receiver 119; two conventional multipurpose control display units or MCDU 130, 132; a common conventional advance flight management computer or AFMC 105; two conventional central air data computers or CADC 111, 121; and two conventional flight guidance computers or DFGC 113, 123. In addition, as also illustrated in FIG. 1, the preexisting conventional FMS system 100 also normally includes conventional symbol generators 134, 136; a conventional system clock 138 for providing GMT to the AFMC 105; two conventional VHF omnidirectional radios or VOR 140, 142; two conventional DME tuning converters 144, 146; and a pair of conventional flight displays 148, 150 for conventionally displaying flight information to the pilot and first officer comprising the flight crew. As further illustrated in FIG. 1, the IRUs 110, 120 are connected to the AFMC 105, and to the symbol generators 134, 136, respectively, through an ARINC 429 data bus; the CADCs 111, 121 are connected to the AFMC 105, and to the symbol generators 134, 136, respectively, through an ARINC 575 data bus; and the DMEs 112, 122, the VORs 140, 142, and the DFGCs 113, 123, are connected to the AFMC 105 through an ARINC 429 data bus as well. In the conventional prior art legacy MD-80/90 navigation solution illustrated by the FMS system 100 of FIG. 1, the common AFMC 105 is utilized to calculate Lateral Guidance, Vertical Guidance, and Performance Calculations for the aircraft. In so doing, the AFMC 105 relies on dual INU input for position data and conventionally generates a blended position solution by applying corrections based on DME distance from known references.

As will be explained in greater detail below, with reference to FIG. 2 and the other figures, the upgraded FMS system 200 of the present invention is believed to provide a viable and cost effective solution for upgrading preexisting flight management systems, such as the preexisting flight management system or FMS 100 illustrated in FIG. 1, preferably increasing functionality and overcoming existing system shortcomings, given today's requirements, found to be present in prior art flight management systems, such as the prior art FMS system 100 illustrated in FIG. 1. For example, as will be explained below, it is expected that the upgraded FMS system 200 of the present invention, will increase the FMS Navigation database storage capacity, provide RNP VNAV and RNAV capability utilizing a GPS based navigation solution, and/or provide Required Time of Arrival or RTA capability, all of which assist in increasing the functionality of and overcoming system shortcomings of the prior art preexisting FMS system 100 being upgraded in accordance with the present invention.

Referring now to FIG. 2, FIG. 2 illustrates an upgraded preexisting flight management system (FMS) 200 in accordance with the present invention, with any preexisting components of the preexisting FMS system 100 which is being upgraded which remain in the upgraded FMS system 200 having the same reference numerals as utilized in FIG. 1. The upgraded preexisting FMS system 200 being described with reference to FIG. 2 is merely exemplary of such upgraded systems in accordance with the present invention and the invention is not intended to be limited to the embodiments presented herein.

As shown and preferred in FIG. 2, the upgraded FMS system 200 preferably retains the legacy AFMC 105 previously present in the preexisting flight management system 100 as well as the legacy IRUs 110, 120, CADCs 111, 121, VHF NAV Receivers 116, 118, DME Receivers 112, 122, and DFGCs 113, 123. The legacy AFMC 105 is preferably retained in the upgraded FMS system 200 in order to exploit its previously proven performance capabilities. The preexisting MCDUs 130, 132 are preferably replaced with new MCDUs 225, 255 which preferably contain navigation computers 280, 282 which manage the flight plan and generate lateral and vertical guidance, auto throttle controls, and configure and synchronize the legacy AFMC 105 to allow it to continue to calculate the aircraft performance parameters throughout the flight. Preferably the AFMC performance based pages which appear on the MCDU 225, 255 are accessible through the MCDUs 225, 255 via ARINC 739 protocol, with such performance based pages being illustrated, by way of example, in FIGS. 6-17.

Preferably, the AFMC 105 performance data in the upgraded FMS system 200 of FIG. 2 is utilized to provide estimated time of arrival for each leg of the flight and to the final destination; predicted leg speed and altitude leg cruise winds; progress such as distance to go, ETA and fuel remaining; current speed mode such as parameters associated with LRC/ECON, selected airspeed or mach, limited speed such as VMO, MMO, Flap, Alpha; speed override, and engine out mode; top of descent; top of climb; step climbs; and fuel quantity and fuel used. The desired flight plan route is preferably entered into and calculated by the NAV computer 280, 282, which is preferably RNP capable. In the presently preferred system 200 of the present invention, the flight planning pages are formatted to replicate the existing AFMC 105 pages. Preferably, a subset of the flight plan is automatically transferred to the legacy AFMC 105 from the NAV computers 280, 282 located in the MCDUs 225, 255, respectively, via a conventional ARINC 739 interface therebetween. Preferably, in the upgraded FMS system 200 of the present invention, this subset of the flight plan consists of the origin, destination and interim waypoints. Waypoints on the SIDS and STAR are preferably transferred to the legacy AFMC 105 via lat long data since the AFMC 105 database in accordance with the present invention will not include all required terminal procedures thereby allowing it to hold a smaller database, thereby assisting the upgraded FMS system 200 in overcoming memory limitation issues present in the preexisting FMS system 100.

Preferably, in the upgraded FMS system 200 of the present invention, the legacy AFMC 105 now preferably calculates the top of descent and top of climb waypoints based on best performance for the aircraft and transmits these waypoints on an ARINC 702 data bus to respective data concentrator units 201, 251. The DCUs 201, 251 are respectively connected to the NAV computers 280, 282, and preferably relay this information to the NAV computers 280, 282 which, preferably, in turn, include them in the flight profile for the aircraft.

The AFMC 105 preferably provides an interface page which allows for waypoint insertion referenced by Latitude and Longitude. Depending on the legacy AFMC 105 employed, this interface may be limited by format, such as to $1/10^{th}$ of a minute or one decimal place accuracy for both Latitude and Longitude values. In such an instance, the resolution of the equivalent AFMC waypoint would be limited, such as to approximately 608 feet; however, it is believed that such an inaccuracy would not be significant to the Performance solution calculated by the AFMC 105, and would not be relevant to the Lateral and Vertical guidance provided by the NAV computers 280, 282.

Referring now to the inertial reference units or IRUs 110, 120 employed in the upgraded FMS system 200 of the present invention, these IRUs 110, 120 are the primary source of position data, i.e. latitude and longitude, utilized by the legacy AFMC 105 to generate the navigation solution for the upgraded FMS system 200. It is a known fact that normally the IRU position is most accurate immediately after initialization or alignment and normally degrades throughout the flight until such time as the IRU is realigned. In the presently preferred upgraded FMS system 200 of the present invention, the NAV computers 280, 282 preferably rely on the position data from the IRUs 110, 120, respectively, augmented with conventional dual Beta 3 GPS receivers 202, 252, respectively, for primary navigation. Preferably, a Kalman filter algorithm is utilized to blend the GPS data with the IRU position data, with this blended GPS/IRU data preferably being transmitted to the AFMC 105 in place of the normal IRU generated data. In accordance with the present invention, in instances where the GPS data may not be available for any extended amount of time, data from the DME Receivers 112, 122 is preferably used to augment the IRU position information. In addition, preferably the NAV computers 280, 282 may include an MCDU page which could allow the IRUs 110, 120 to be aligned while the aircraft is at the gate. Furthermore, preferably the IRU 110, 120 position can be re-initialized using GPS position and time data if desired.

In the presently preferred upgraded FMS system 200 of the present invention, the NAV computers 280, 282 preferably interface directly with the digital flight guidance computers or DFGC 113, 123, respectively, in order to maintain control authority of the provided autopilot and the auto-throttle functions at all times.

Furthermore, the presently preferred navigation solution provided by the upgraded FMS system 200, in addition to the aforementioned class Beta-3 GPS receivers 202, 252, utilizes two conventional TSO-C190 antennas, with the GPS receivers 202, 252, by way of example, being TSO-C145c class Beta-3 GPS receivers. The resultant GPS signal is preferably fed to the respective DCUs 201, 251 to be used for augmentation of position information from the IRUs 110, 120, respectively.

The presently preferred navigation solution in the upgraded FMS system 200 is preferably built around the two NAV computers 280, 282, which, by way of example, are DO-229D, DO-238A and DO-236B compliant and RNP capable. These NAV computers 280, 282, by way of example, are TSO-C146c-Gamma 3 compliant with additional RNAV and VNAV RNP capabilities and are preferably respectively housed within the MCDU 225, 255 enclosure for reducing space and power requirements although, if desired, they need not be housed there. By way of example, in the illustrated FMS system 200 of the present invention, described with respect to the MD-80/90 FMS system, each of the NAV computers 280, 282 is preferably RNP 0.3 capable without the database limitations of the preexisting AFMC 105. Preferably, the FMS menu structure in the upgraded FMS system 200 replicates that of the preexisting AFMC 105 but provides additional features designed to emulate the conventional styled menus.

Each of the MCDUs 225, 255 preferably contains microprocessors making them capable of performing control logic, something which is unavailable in the legacy equipment being upgraded. Each MCDU 225, 255 preferably supports peripheral equipment, such as ACARS, through conventional ARINC 739A compliant interfaces, with the respective MCDUs 225, 255 also preferably acting as the interface to the AFMC 105 via an ARINC 739A interface as well.

The NAV computers 280, 282 in the present invention are preferably able to calculate Required Time of Arrival or RTA for any flight plan waypoint as well as required leg airspeed to meet RTA constraints. The presently preferred NAV computers 280, 282 preferably provide RTA capabilities to any specific waypoint through the LEGS menu page. In this regard, when an RTA is established at one of the flight plan waypoints, the respective NAV computer 280, 282 commands the leg speeds for the legs leading up to that waypoint to achieve the required time of arrival. Preferably a boundary checking of the commanded airspeed is performed to assure that the aircraft is being operated within a safe airspeed envelope and a warning is preferably provided to the pilot if the RTA is not obtainable due to safe airspeed restrictions.

The AFMC 105 preferably continuously calculates the estimated time of arrival or ETA for each of the legs in the flight plan based on the current aircraft performance and the NAV computer 280, 282 uses this ETA to determine the speed needed to reach the designated waypoint at the RTA. Preferably, as the flight progresses, the NAV computers 280, 282 monitor the calculated ETAs and modify the leg speeds accordingly. Each flight plan leg is preferably analyzed to determine the appropriate speed constraints which need to be followed, with the AFMC 105 leg speed based on best performance preferably being used by the NAV computer 280, 282 in cases where an RTA has not been specified.

Figure 5:
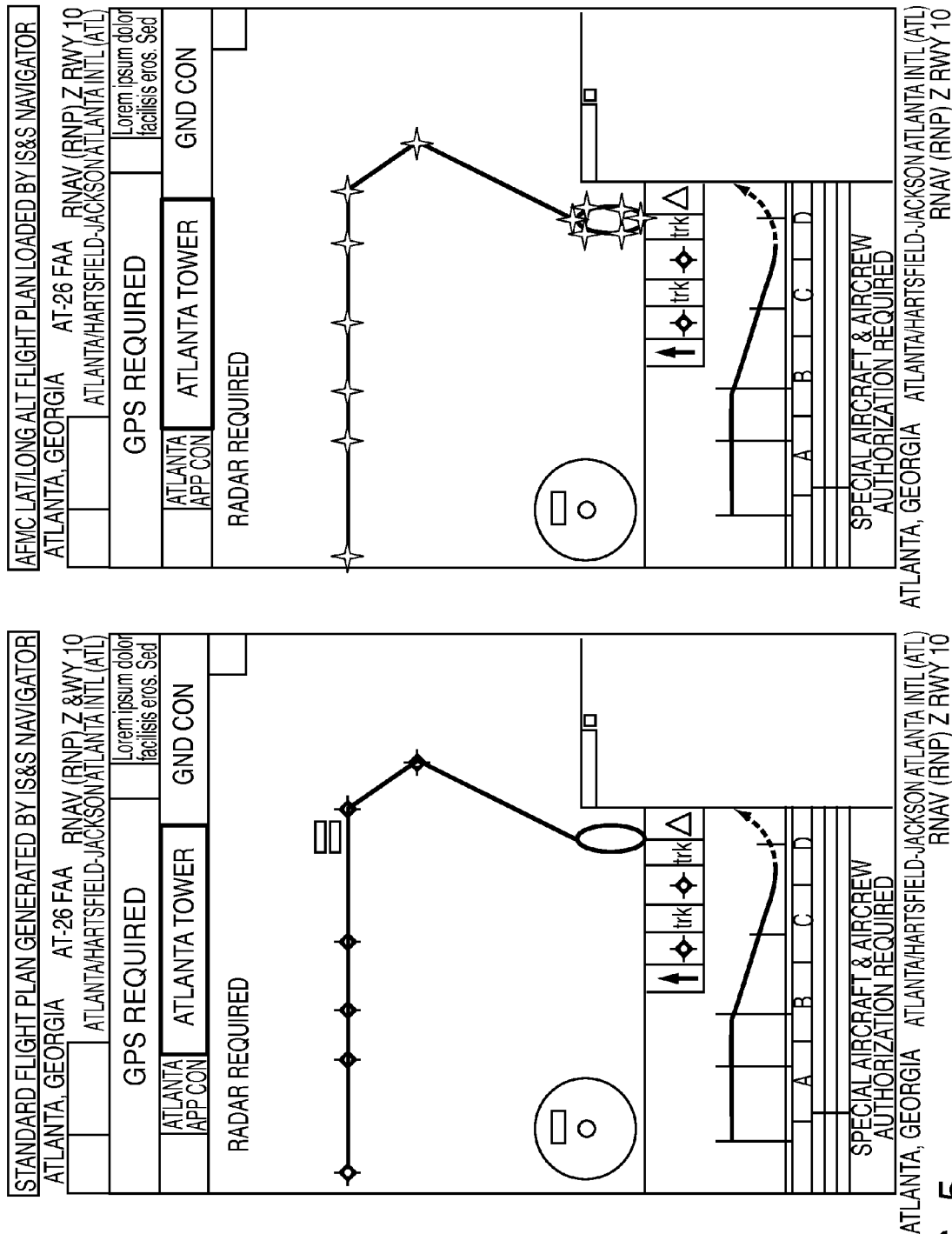
FIG. 5 is a diagrammatic illustration comparing an exemplary standard flight plan generated by the upgraded flight management system of FIG. 2 to an alternate loaded flight plan.

Preferably, flight path discontinuities are resolved by the NAV computers 280, 282 and transmitted to the AFMC 105 as flight plan modifications. Although the AFMC 105 normally assumes direct point to point legs when its flight plan is created by connecting Latitude/Longitude coordinates, any slight deviation, such as due to flight path discontinuities, preferably does not create a significant error in the AFMC 105 computed performance data. Transferring the flight plan using Latitude/Longitude coordinates excludes all curved RF type legs which can result in a deviation from the defined path. However, this deviation can be minimized in accordance with the present invention by inserting additional waypoints to approximate the curved path and, hence, minimize any significant impact on the performance calculations of the AFMC 105. This is illustrated in FIG. 5 which illustrates the transfer of curved legs to the AFMC 105. It should be noted that while speed constraints may be manually entered per leg to satisfy RTA requirements or determined from the AFMC 105, constraints associated with published procedures and aircraft limitations would preferably be used to provide a not to exceed envelope for airspeed. Preferably the RTA can be primarily achieved by adjusting the speeds prior to top of descent.

As discussed above various performance calculations are preferably obtained from the AFMC 105 and used by the navigation computers 280, 282. For example, the ETA for each leg and to the final destination, is preferably made available to the navigation computers 280, 282 by querying the AFMC 105 via the A739 progress page. The information is preferably received via textual data and is translated by the navigation computers 280, 282 to numeric format. The navigation computers 280, 282 then preferably use this data to cross check the RTA performance.

Another performance calculation is preferably the predicted leg speed and altitude leg cruise winds. Generally, this information is not required by the navigation computers 280, 282 and is only displayed for pilot information and modification as part of the conventional A739 interface. Similarly, distance to go, ETA, and fuel remaining are also not generally required by the navigation computers 280, 282 and are only displayed for pilot information. This is also preferably true for current speed modes and fuel quantity and fuel used as well, which are not required by the navigation computers 280, 282 and only displayed for pilot information and modification as part of the conventional A739 interface.

Still another performance calculation is top of descent which is preferably calculated based on the pilot entry of end of descent. This information is preferably transmitted from the AFMC 105 to the DCUs 201, 251 via ARINC 702 protocol and inserted to the flight profile by the navigation computers 280, 282 after boundary check are performed on the data. Preferably, at the top of descent, the navigation computers 280, 282 command idle thrust and pitch down to track the target airspeed obtained from the AFMC/DFGCs 105, 113, 123 transmit bus. The command airspeed is preferably boundary checked by the navigation computers 280, 282 prior to transmission to the respective DFGCs 113, 123. Preferably, any modifications to the target EPR and/or target airspeed is monitored and passed along to the respective DFGCs 113, 123 after boundary checking is performed by the navigation computers 280, 282.

Yet another performance calculation which is preferably performed is top of climb which is preferably calculated based on the climb limit thrust to each altitude constraint. The top of climb is preferably transmitted from the AFMC 105 to the DCUs 201, 251 via ARINC 702 protocol and inserted to the flight profile by the respective navigation computers 280, 282. Preferably, during the climb, the AFMC 105 calculates required thrust and pitch. The navigation computers 280, 282 command climb limit thrust and pitch to track the profile obtained from the AFMC/DFGCs 105, 113, 123 transmit bus. The commands are preferably boundary checked by the navigation computers 280, 282 prior to transmission to the respective DFGCs 113, 123. Preferably, any modifications to the auto-throttle commands and/or pitch is monitored and passed along to the respective DFGCs 113, 123 after boundary checking is performed by the navigation computers 280, 282.

Still another performance calculation preferably being performed are the step climb points which are preferably calculated by the AFMC 105 based on optimum altitude and selected economy modes. Preferably, during the climb of the aircraft, the AFMC 105 calculates required thrust and pitch. The navigation computers 280, 282 preferably command climb limit thrust and pitch to track the profile obtained from the AFMC/DFGCs 105, 113, 123 transmit bus. The commands are preferably boundary checked by the navigation computers 280, 282 prior to transmission to the respective DFGCs 113, 123. As with the top of climb, for step climbs as well, any modifications to the auto-throttle commands and/or pitch is preferably monitored and passed along to the DFGCs 113, 123 after boundary checking is performed by the respective navigation computers 280, 282.

As was previously discussed, the navigation computers 280, 282 preferably govern the auto-throttle, pitch and roll commands to the respective DFGC 113, 123 during all phases of flight of the aircraft. During the approach phase for the aircraft, less priority is preferably given to the performance related pitch and auto-throttle commands provided by the AFMC 105. The control command are preferably computed and enforced by the navigation computers 280, 282 to maintain the vertical, horizontal and optimum airspeeds for the required approach path for the aircraft through final approach. Preferably, guidance during missed approach for the aircraft is also computed and maintained by the navigation computers 280, 282 in order to meet RNP requirements.

With respect to the menu interface being preferably provided, the MCDU 225, 255 preferably utilizes the existing AFMC 105 menu structure via the ARINC 739 protocol for all performance pages. The navigation computers 280, 282 preferably replicate the menu structure of the existing AFMC 105 for flight planning in order to help minimize pilot training on the upgraded system 200 so as to, preferably, help make the operations of the upgraded FMS system 200 of the present invention as seamless a transition as possible from the prior preexing flight management system 100 which the flight crew had been familiar with on the aircraft in which the FMS system has been upgraded. In this regard, preferably the navigation computers 280, 282 maintain absolute understanding of the AFMC 105 menu structure at all times and react to pilot entries in the same manner as in the preexisting legacy AFMC 105. For example, the navigation computers 280, 282 transfer the flight plan information to the AFMC 105 via ARINC 739 protocol in the same way that the AFMC 105 expects it from the MCDU 225, 255. Furthermore, the communications with the AFMC 105 is preferably based on automated use of the MCDU 225, 255 page interfaces, with the FMS system 200 of the present invention preferably allowing direct access to the AFMC 105 performance pages and automating communications for the various parameters located on other AFMC 105 performance pages, as will be discussed in greater detail with respect to FIGS. 6-17.

As shown and presently preferred in FIG. 2, the displays 148 and 150 of FIG. 1 may be comprised of conventional integrated flat panel displays 235, 265, respectively, having associated conventional display control panels 230, 260, respectively, with the respective display control panels 230, 260 being connected between the associated flat panel display 235, 265 and the corresponding MCDU 225, 255, as well as being connected to the respective DCU 201, 251, as shown in FIG. 2.

Figure 3A:
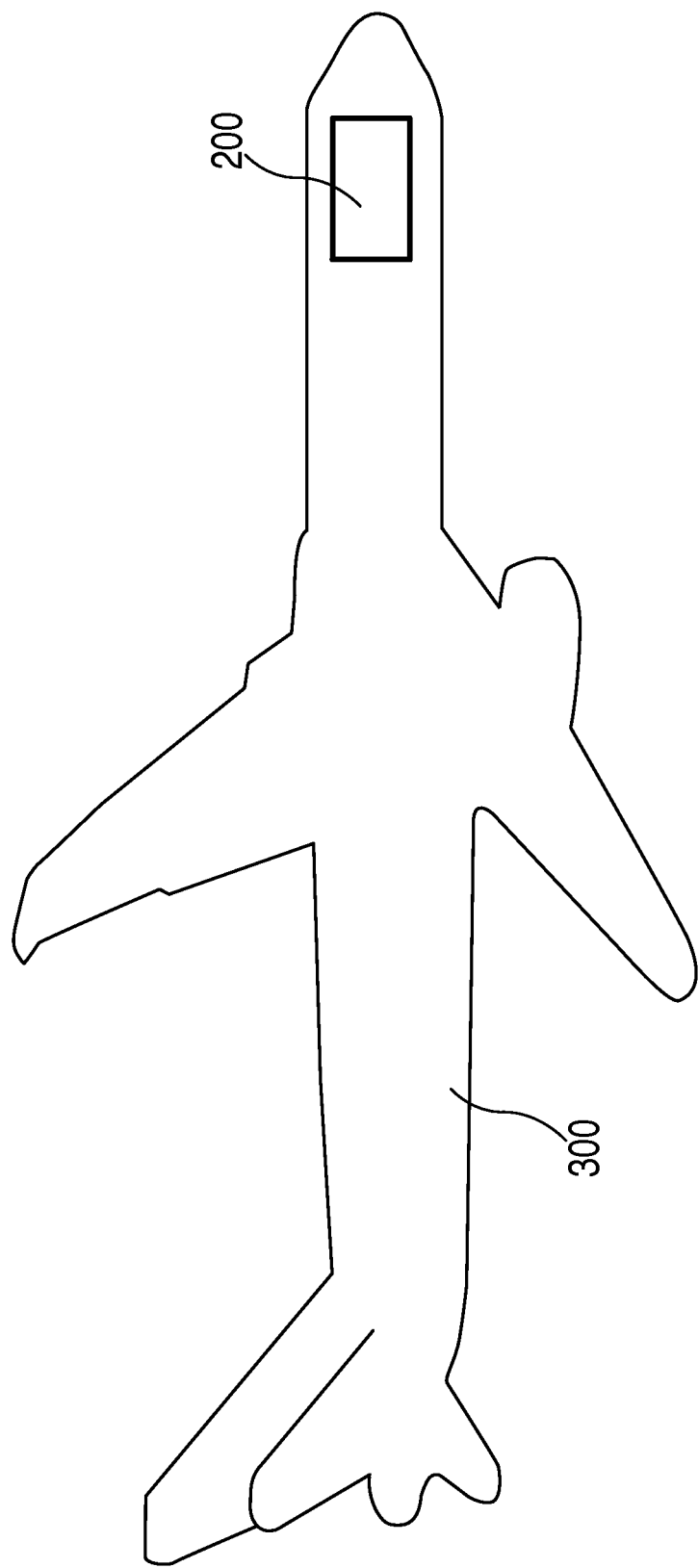
FIG. 3A is a representative diagrammatic illustration of an MD-80/90 aircraft with the upgraded preexisting flight management system of FIG. 2 on board.

As diagrammatically illustrated in FIG. 3A, the presently preferred flight management system 200 is located on board the aircraft 300 for enabling control of the aircraft 300 by the flight crew. As was previously mentioned, the legacy AFMC 105 contained in the upgraded FMS system 200 on board the aircraft 300 is preferably still able to exploit its aircraft performance capabilities throughout the flight of the aircraft 300. In this regard, as will be explained below with reference to FIGS. 6-17, since, preferably, the legacy AFMC 105 is what is utilized for performance calculations in the upgraded FMS system 200 of the present invention, the menu pages relating to performance are preferably directly accessible through the MCDU 225, 255. In this regard, these initialization pages include such pages as PERFORMANCE INIT, TAKEOFF REF, and APPROACH REF.

Figure 3B:
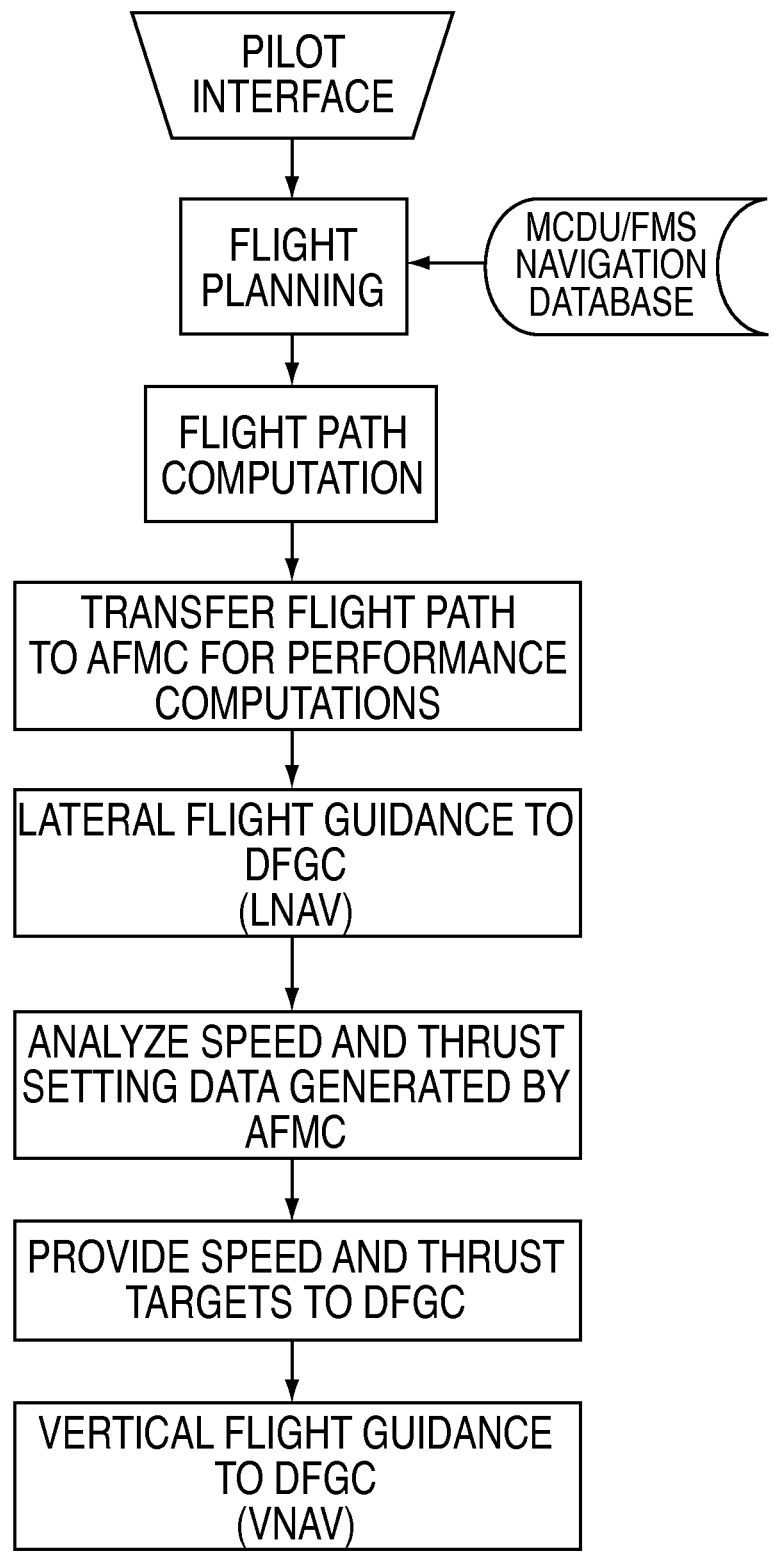
FIG. 3B is a representative system flow chart of the software employed to carry out the related functions of the Navigator portion of the MCDU in the upgraded system of FIG. 2.

Before describing the performance pages in greater detail, suffice it to say that, FIG. 3B, by way of example, illustrates a typical representative system flow chart for the software employed to enable the related functions described above of the navigation computers 280, 282 located in the respective MCDUs 225, 255 to be carried out. For example, the navigator computers 280, 282 may be conventionally programmed in C to carry out the functions illustrated in the system flow chart of FIG. 3B. Suffice it say that in accordance with the system flow chart of FIG. 3B, the MCDU/NAV units act as the primary interface to the pilot for flight planning purposes. The MCDU/NAV internal navigation database is utilized to retrieve information regarding the various navigation points and aid in computation of the planned flight path. The planned flight path is then transferred to the legacy AFMC 105 to allow it to conventionally compute performance parameters for optimum fuel burn and time en-route. The legacy AFMC 105 thrust and airspeed targets are then conventionally analyzed by the navigation computers 280,282 and a final set of lateral, vertical, thrust and airspeed targets are then provided to the DFGCs 113,123. The system flow chart is self-explanatory and need not be described in further greater detail in order to understand the presently preferred operation of the navigation computers 280, 282 in the upgraded FMS system 200 of the present invention.

Figure 6:
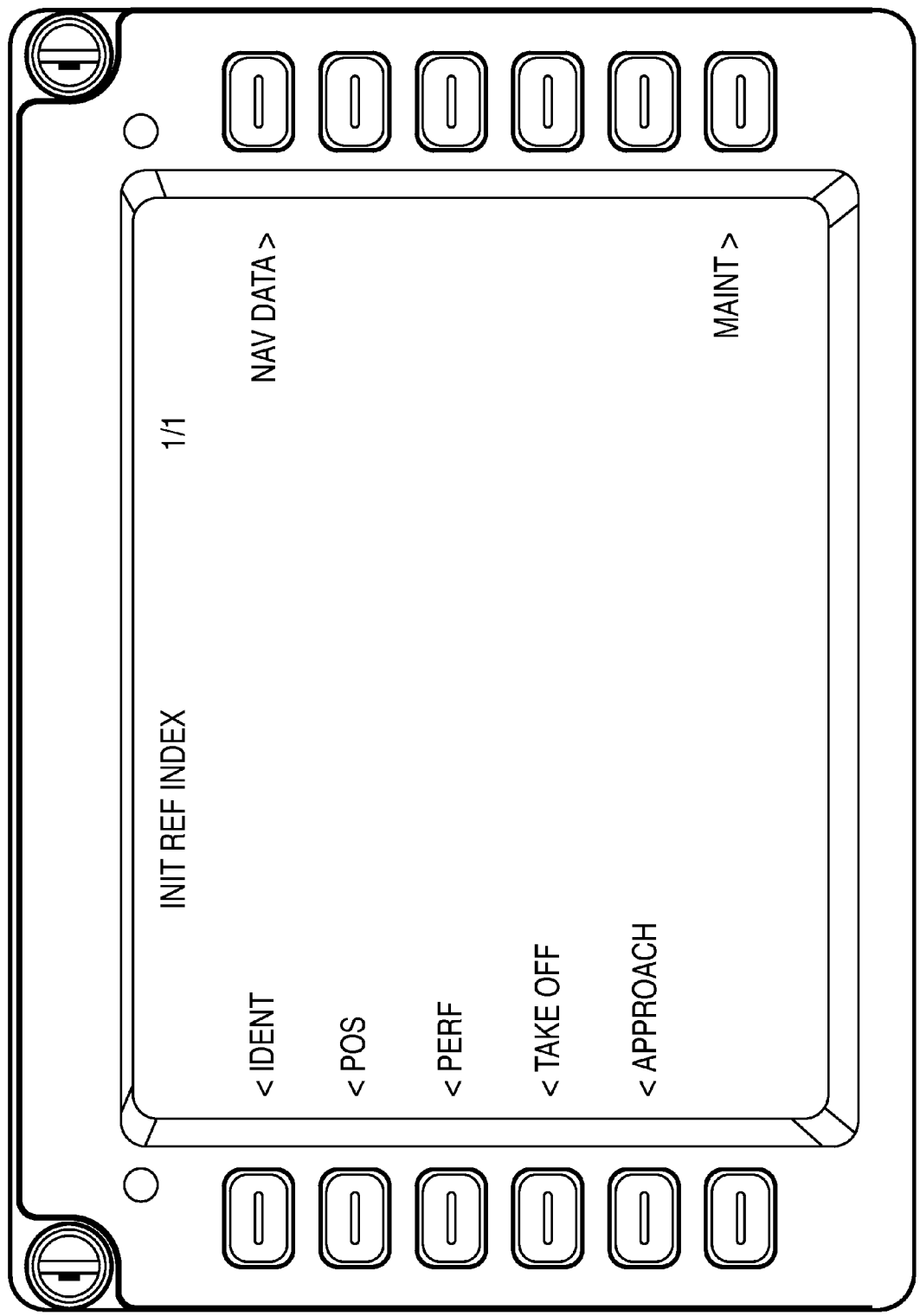
FIG. 6 is a diagrammatic illustration of an exemplary AFMC initialization page accessible through the MCDU in the upgraded flight management system of the present invention as illustrated in FIG. 2.

Referring now to FIG. 6, at least one menu page can comprise an AFMC Initiation Page for providing performance calculations to legacy AFMC 105 (FIG. 2). Preferably, the AFMC Initiation Page can permit access to at least one of the Performance Initiation Page, the Takeoff Reference Page, or the Approach Reference Page, as described below.

Figure 7A:
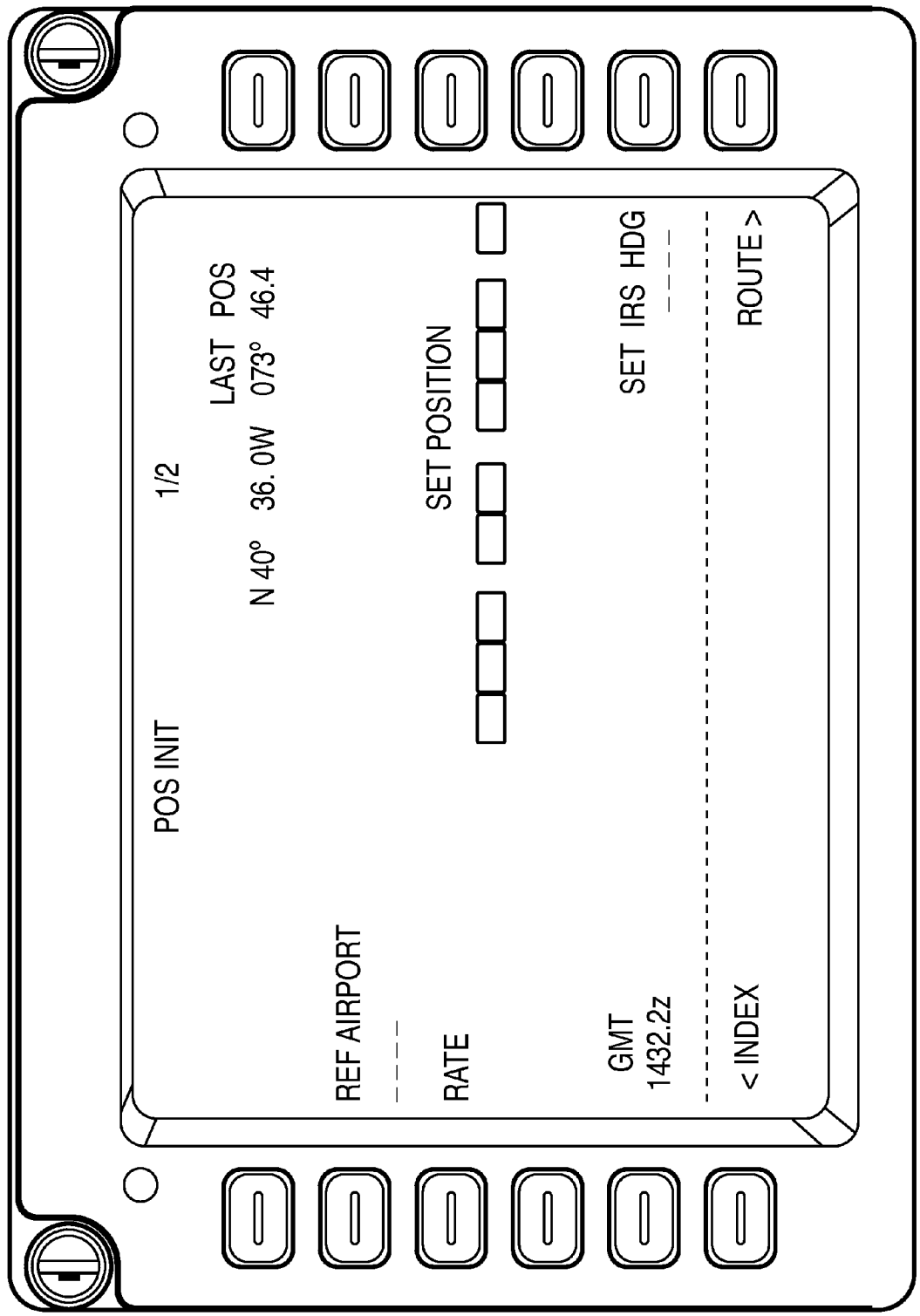
FIGS. 7A and 7B are diagrammatic illustrations of an exemplary AFMC position initialization and position reference page, respectively, accessible through the MCDU in the upgraded flight management system of the present invention as illustrated in FIG. 2.
Figure 7B:
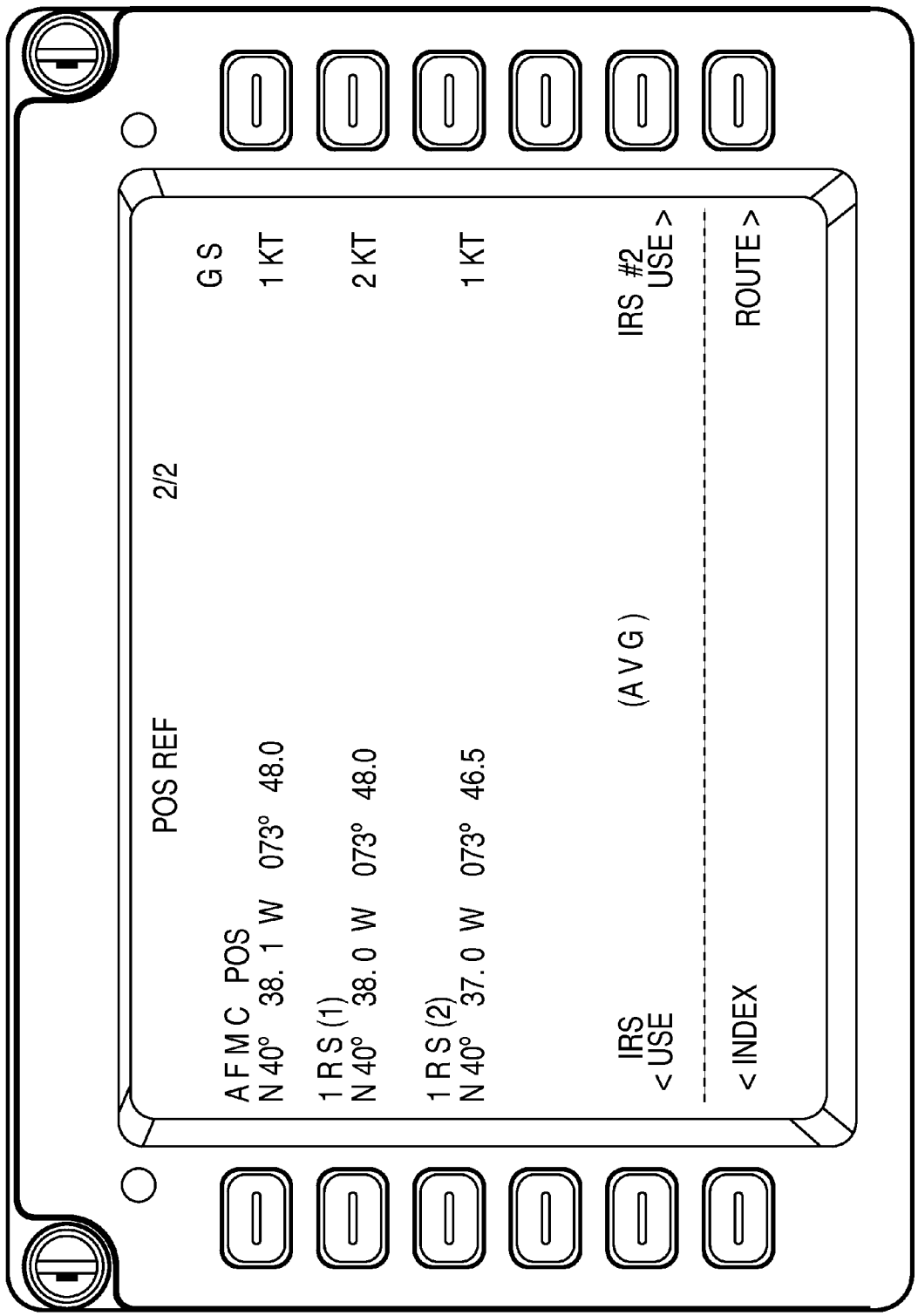

Referring now to FIGS. 7A and 7B, at least one menu page can comprise a Position Initialization Page (FIG. 7A) and another menu page can comprise a Position Reference Page (FIG. 7B). The Position Initialization Page (FIG. 7A) can allow for initialization and/or verification of IRU 110, 120 (FIG. 2) and/or selections for legacy AFMC 105 (FIG. 2), whereas the Position Reference Page (FIG. 7B) allows for verification of position.

Figure 8:
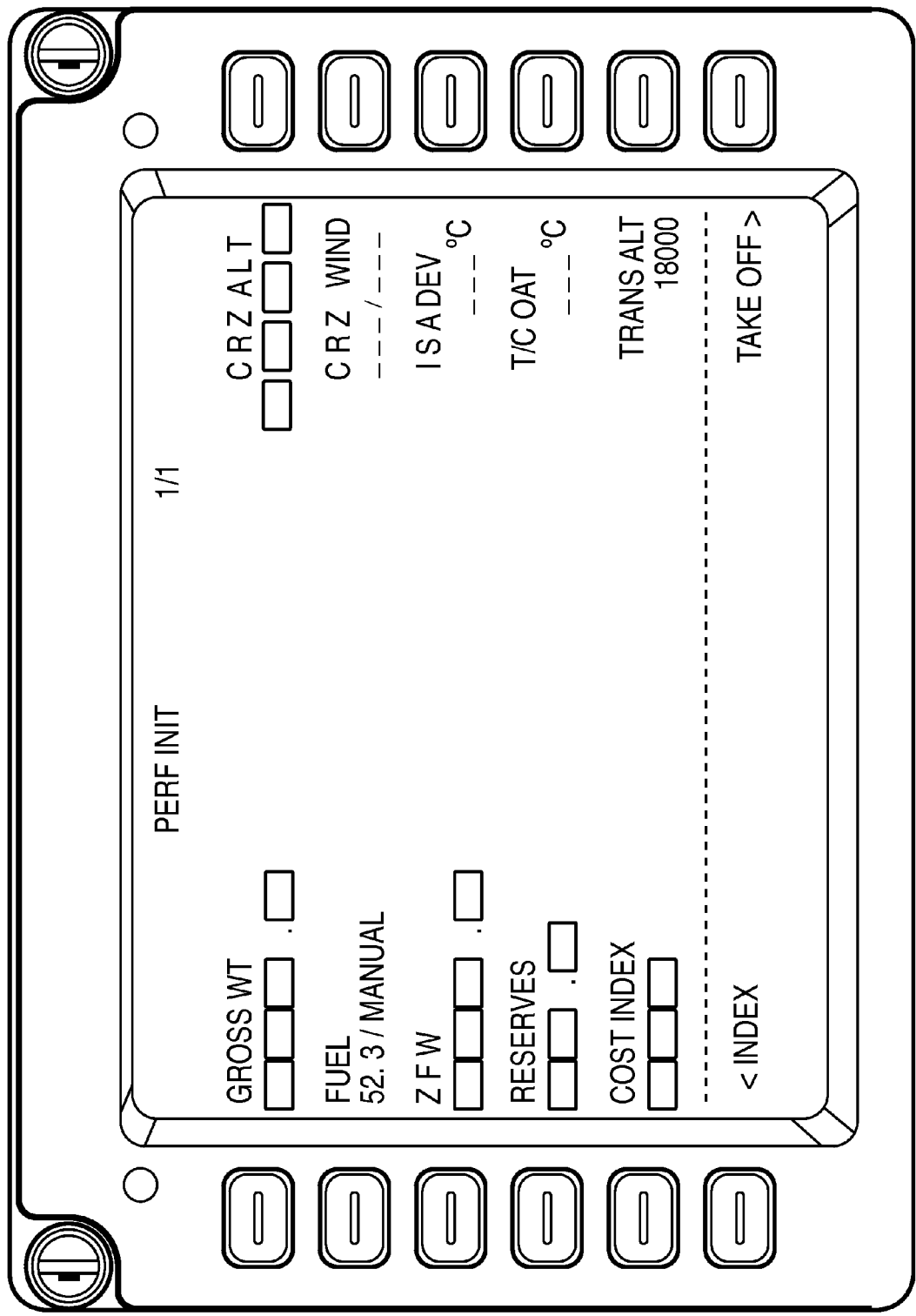
FIG. 8 is a diagrammatic illustration of an exemplary AFMC performance initialization page accessible through the MCDU in the upgraded flight management system of the present invention as illustrated in FIG. 2.

Referring now to FIG. 8, at least one menu page can comprise a Performance Initiation Page. The Performance Initiation Page can allow for entry of fuel, weight, and/or performance configurations to be provided to legacy AFMC 105 (FIG. 2).

Figure 9:
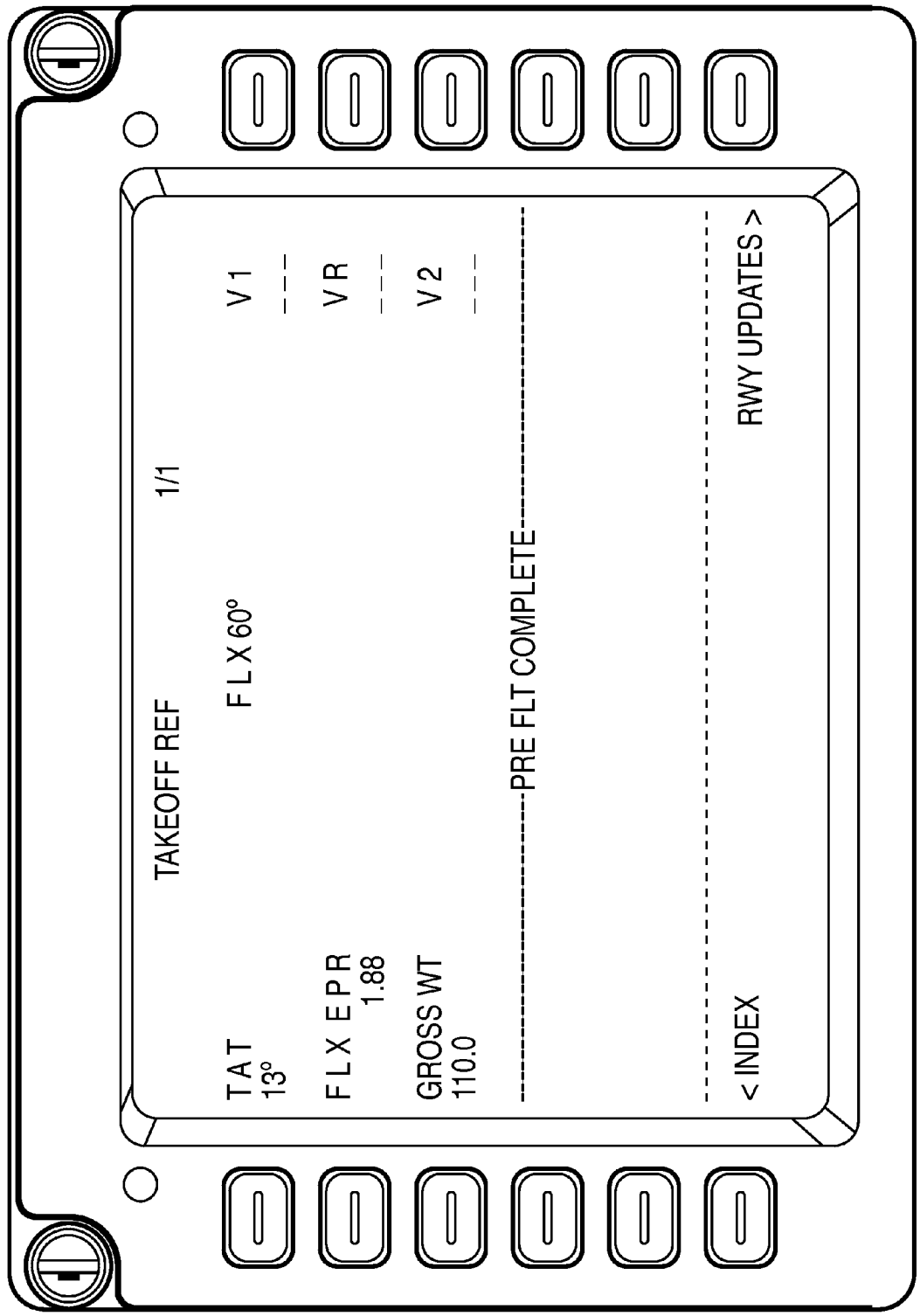
FIG. 9 is a diagrammatic illustration of an exemplary AFMC takeoff reference page accessible through the MCDU in the upgraded flight management system of the present invention as illustrated in FIG. 2.

Referring now to FIG. 9, at least one menu page can comprise a Takeoff Reference Page. The Takeoff Reference Page can allow for entry of takeoff performance and reference speed configurations to be provided to legacy AFMC 105 (FIG. 2).

Figure 10:
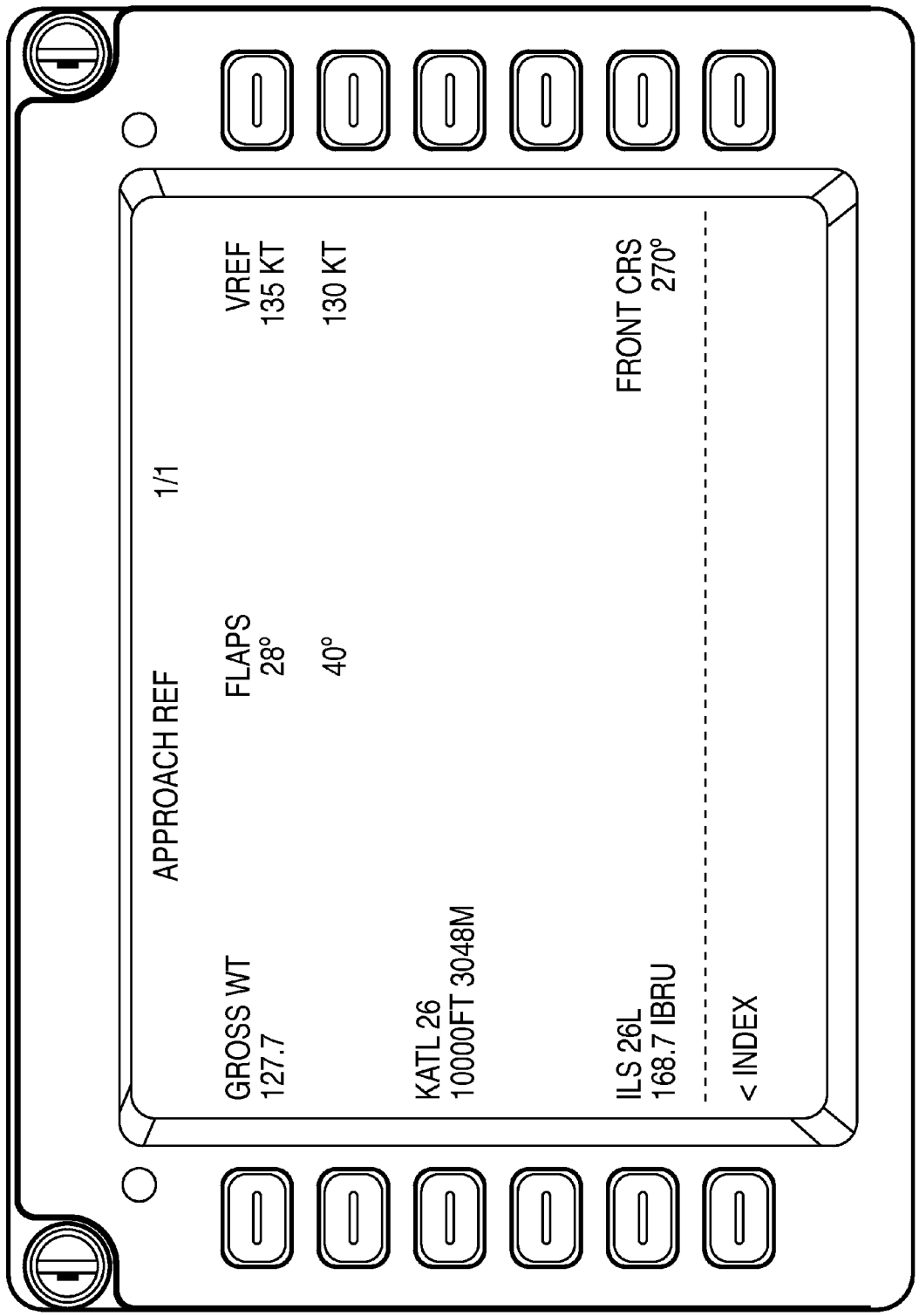
FIG. 10 is a diagrammatic illustration of an exemplary AFMC approach reference page accessible through the MCDU in the upgraded flight management system of the present invention as illustrated in FIG. 2.

Referring now to FIG. 10, at least one menu page can comprise an Approach Reference Page. The Approach Reference Page can allow for entry of approach performance and reference speed configurations to be provided to legacy AFMC 105 (FIG. 2).

Figure 11:
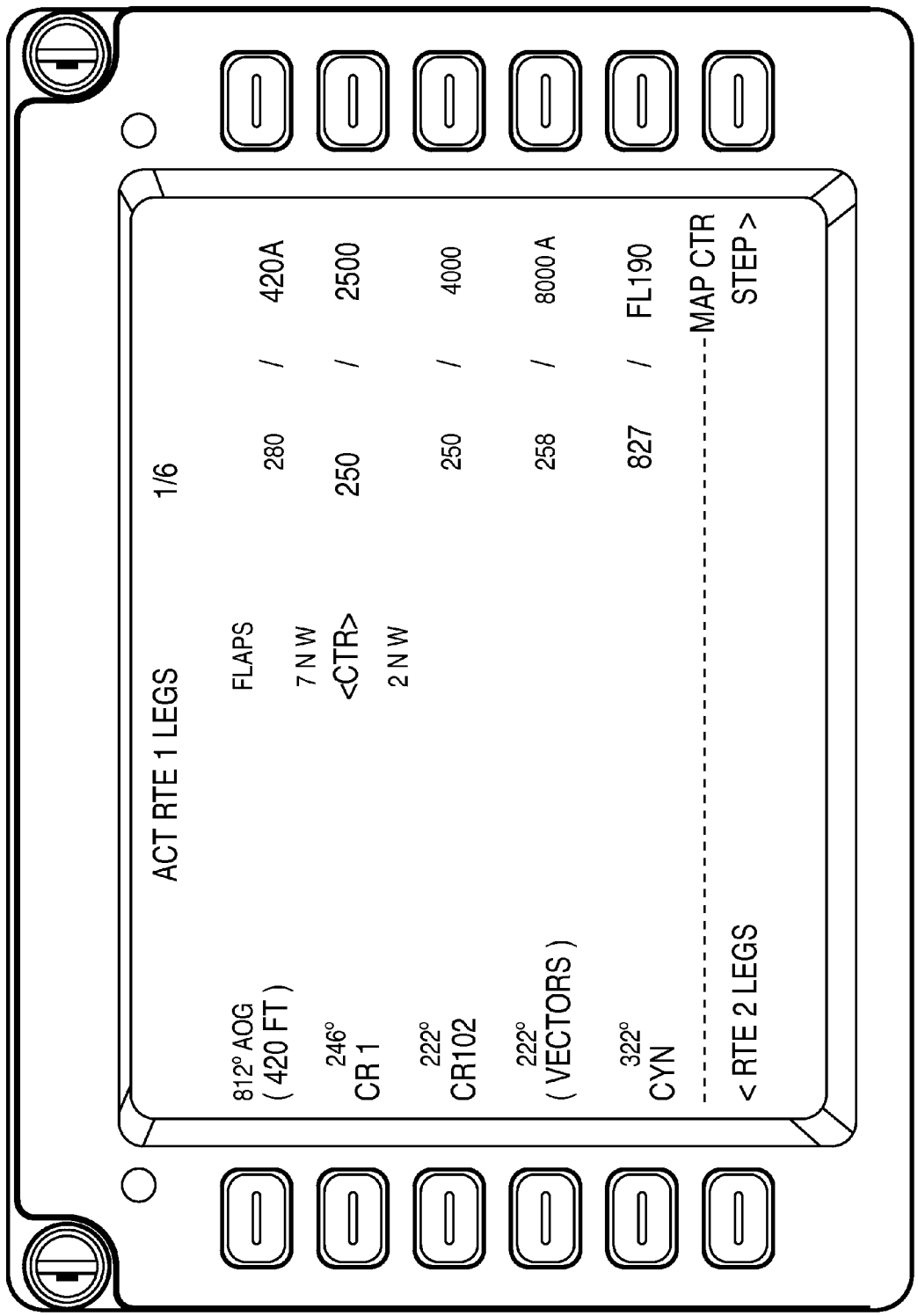
FIG. 11 is a diagrammatic illustration of an exemplary legacy AFMC LEGS page transferred to the AFMC using the MCDU interface in accordance with the upgraded flight management system of the present invention as illustrated in FIG. 2.

Referring now to FIG. 11, at least one menu page can comprise a legacy AFMC LEGS Page, labeled in the illustrative example as "ACT RTE 1 LEGS". This menu page illustrates the actual route 1 LEGS Page transferred to the legacy AFMC 105 (FIG. 2) using the MCDU interface in accordance with the present invention.

Figure 12:
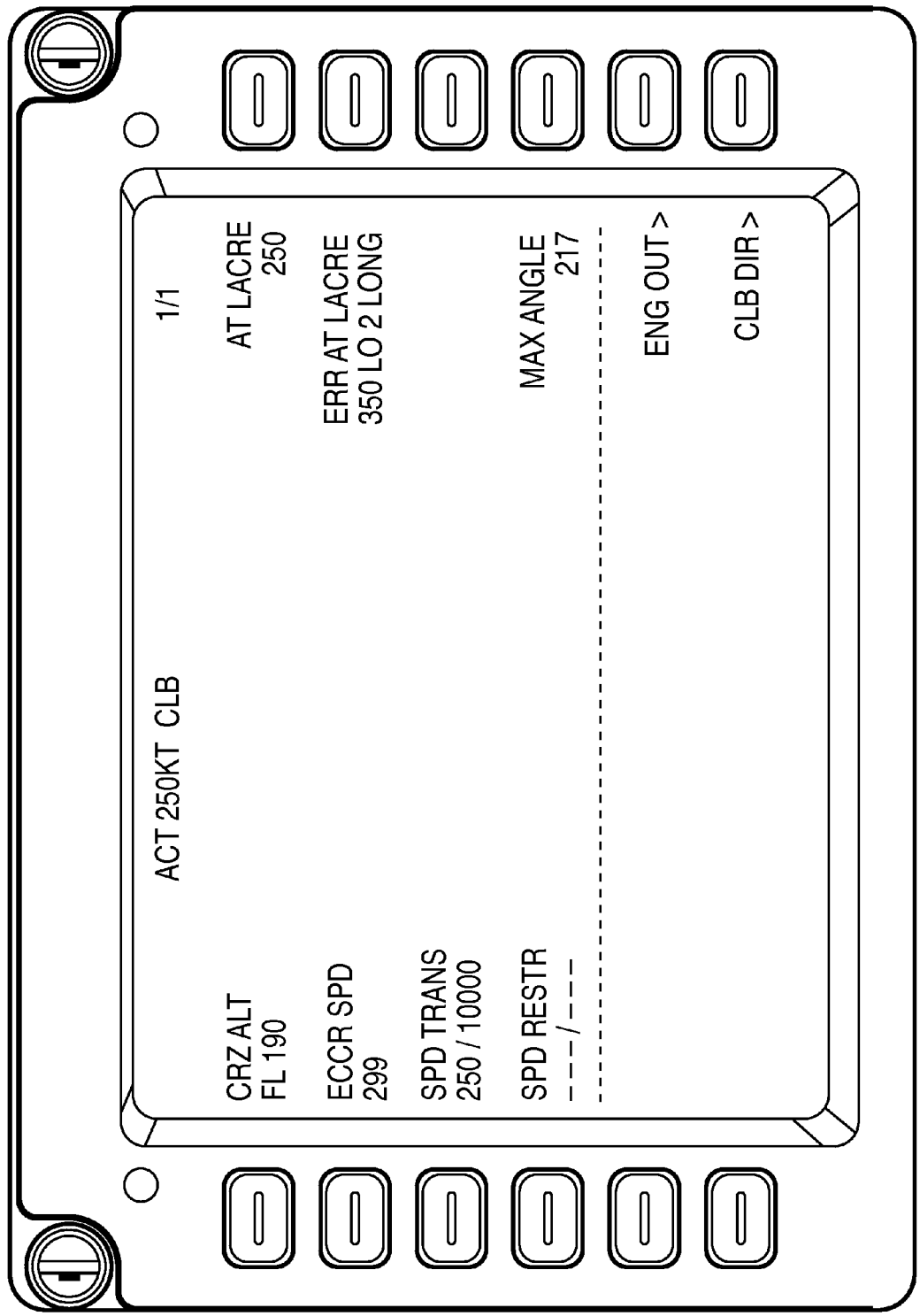
FIG. 12 is a diagrammatic illustration of an exemplary AFMC climb page accessible through the MCDU in accordance with the upgraded flight management system of the present invention as illustrated in FIG. 2.

Referring now to FIG. 12, at least one menu page can comprise the AFMC CLIMBS Page, as referenced above, labeled "ACT 250KT CLB" in the example shown. This Page can display such parameters as cruise altitude and/or speed details for each leg of a flight of aircraft 300 (FIG. 3).

In various embodiments, at least one menu page can comprise a Route Menu Page (not shown). In such an instance, the Route Menu Page can provide an interface by which to enter flight plans to be provided to VHF NAV receiver 116 (FIG. 2) and/or legacy AFMC 105 (FIG. 2). In further embodiments, at least one menu page can comprise a Holding Menu Page (not shown) to define holding patterns at a selected waypoint of the flight plans.

In other embodiments, at least one menu page can comprise a Departure and/or Arrival Page (not shown) to select departure and/or arrival procedures to be provided to VHF NAV receiver 116 (FIG. 2). The departure and/or arrival procedures can be stored within a navigation database of VHF NAV receiver 116 (FIG. 2) and transferred to legacy AFMC 105.

In various embodiments, at least one menu page can comprise one or more Progress Pages (not shown), each displaying at least one of an altitude, a distance remaining, an ETA, or a fuel burn for each of the legs in a flight plan of aircraft 300 (FIG. 3A). In such an instance, any of this data can automatically be retrieved from legacy AFMC 105 (FIG. 2). Furthermore, at least one menu page can comprise a Fix Page (not shown) for querying the navigation database of VHF NAV receiver 116 for fix information. In addition, at least one menu page can comprise a Climb Page for selecting climb performance modes and/or for specifying climb constraints (e.g., cruising altitude, climb mode, speed constraints, etc.) for aircraft 300 (FIG. 3A).

Figure 13:
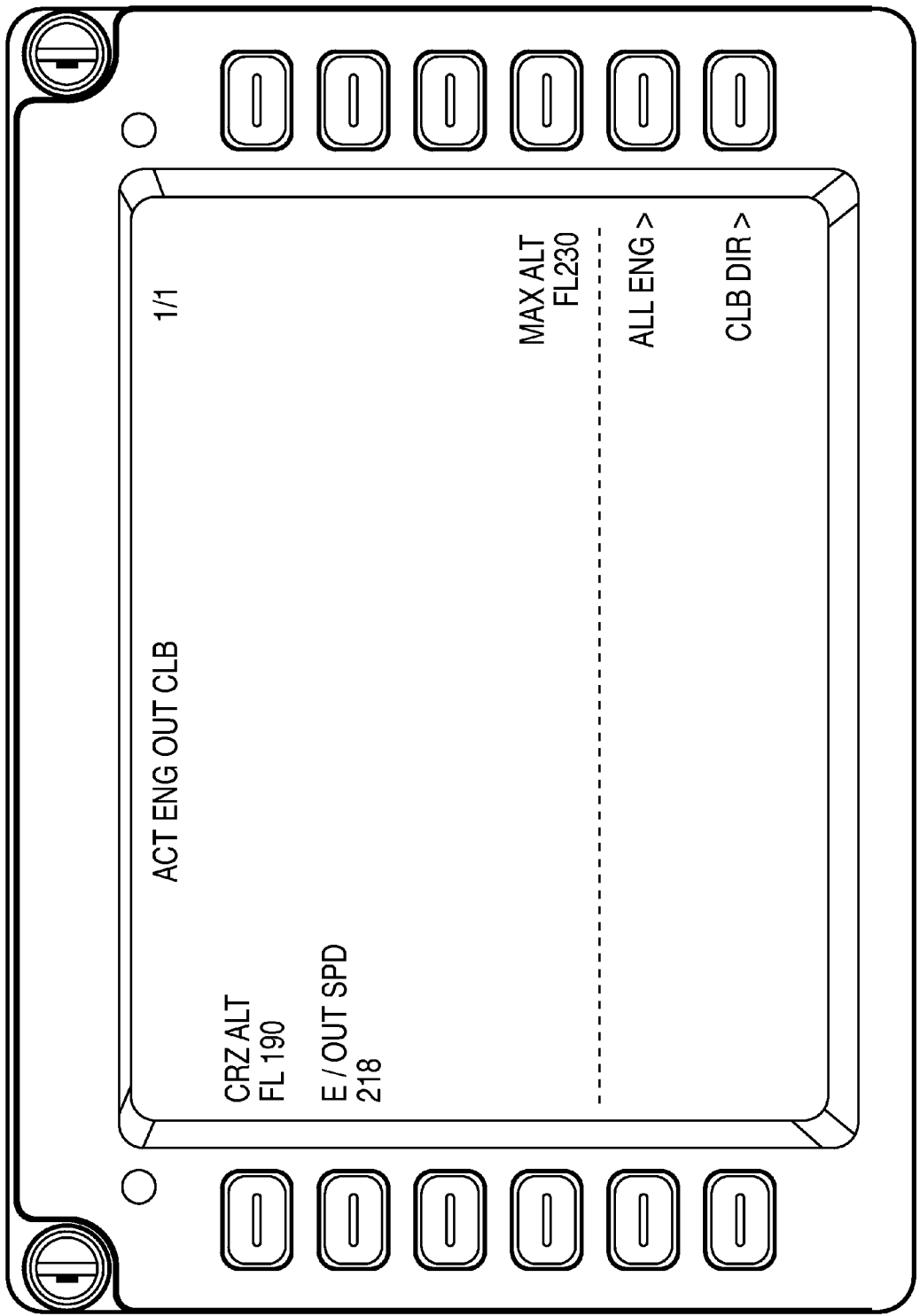
FIG. 13 is a diagrammatic illustration of an exemplary AFMC engine out climb page accessible from the climb page of FIG. 12 in accordance with the present invention in the upgraded flight management system of FIG. 2.

Referring now to FIG. 13, in some embodiments, the menu page can comprise an Engine Out Climb Page. In such an instance, the Engine Out Climb Page can provide an interface by which to recalculate climb performance based on single engine performance data. In various embodiments, the Engine Out Climb Page can be accessed through the Climb Page, as described above.

Figure 14:
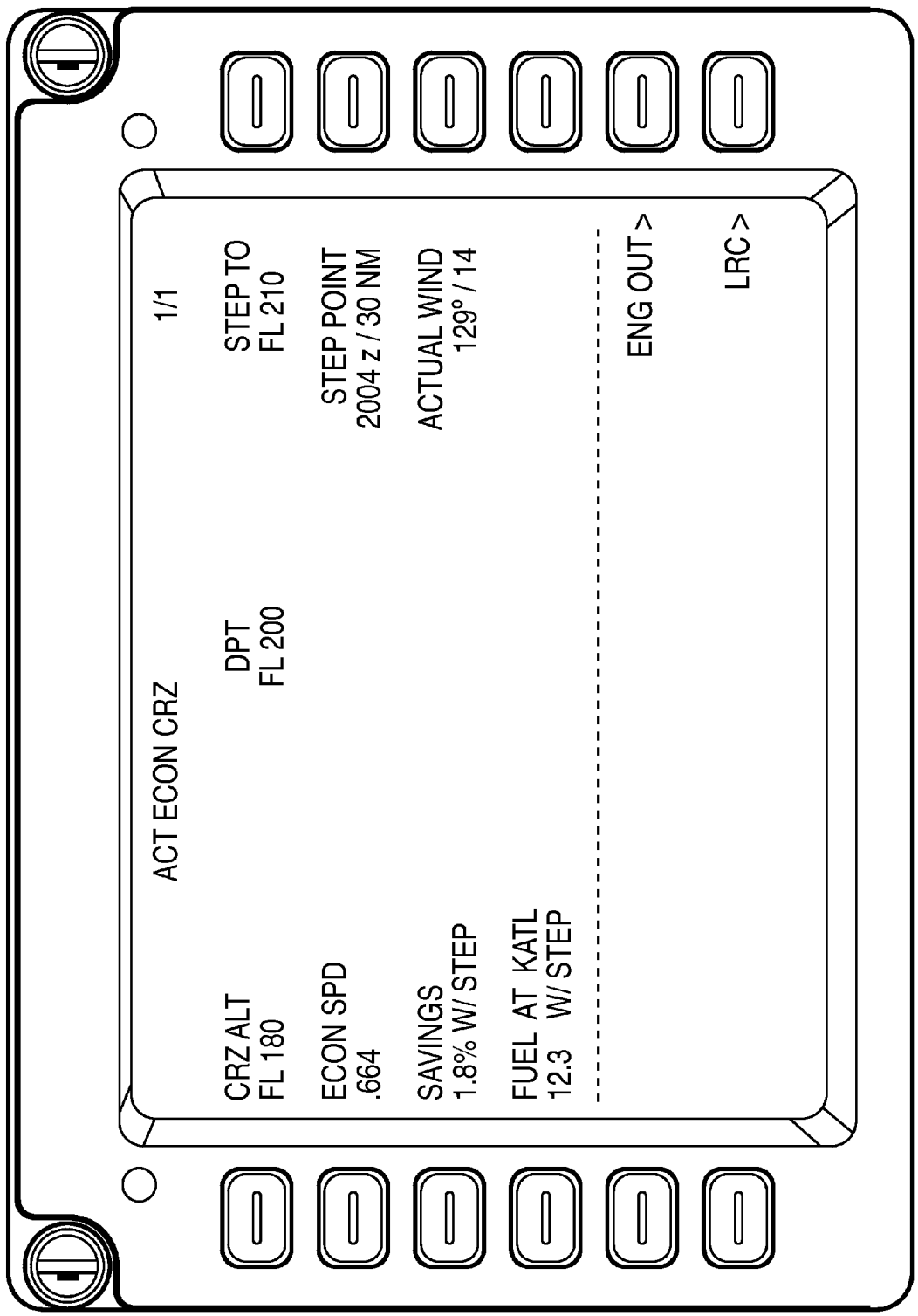
FIG. 14 is a diagrammatic illustration of an exemplary AFMC economy cruise page accessible from the MCDU in accordance with the upgraded flight management system of the present invention as illustrated in FIG. 2.
Figure 15:
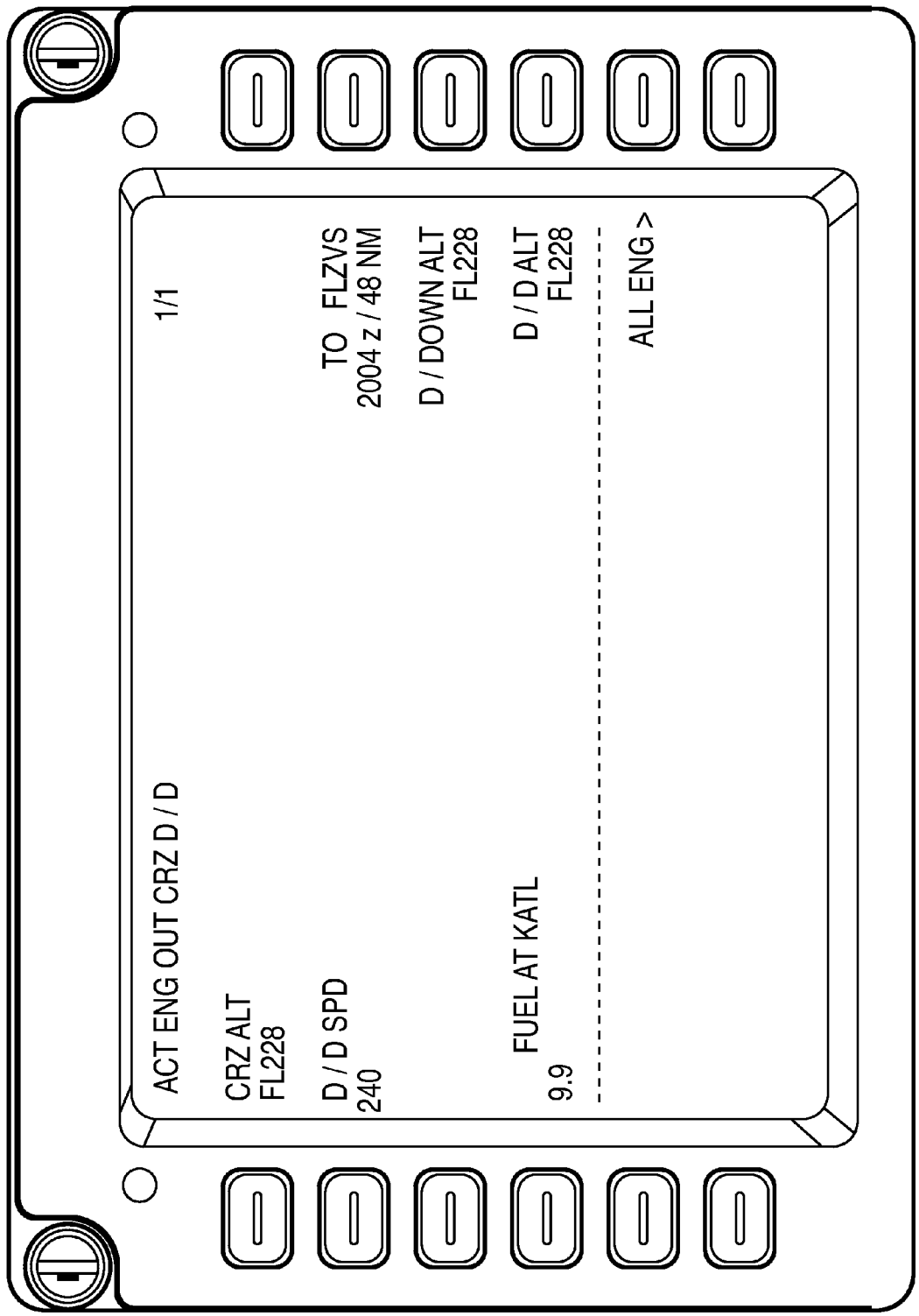
FIG. 15 is a diagrammatic illustration of an exemplary AFMC engine out cruise page accessible from the cruise page of FIG. 14 in accordance with the present invention in the upgraded flight management system of FIG. 2.

Referring now to FIG. 14, in some embodiments, the menu page can comprise a Cruise Page selecting cruise performance modes and/or for specifying cruise constraints (e.g., cruising altitude, drift down altitude, cruise airspeed, minimum safe operating speed, etc.) for aircraft 300 (FIG. 3A), such as the economy values illustrated in FIG. 14. Referring now to FIG. 15, the menu page can comprise an Engine Out Cruise Page to provide an interface by which to recalculate cruise performance based on single engine performance data. In many embodiments, the Engine Out Cruise Page and a Cruise Drift Down Page (not shown) can be accessible from the Cruise Page.

Figure 16:
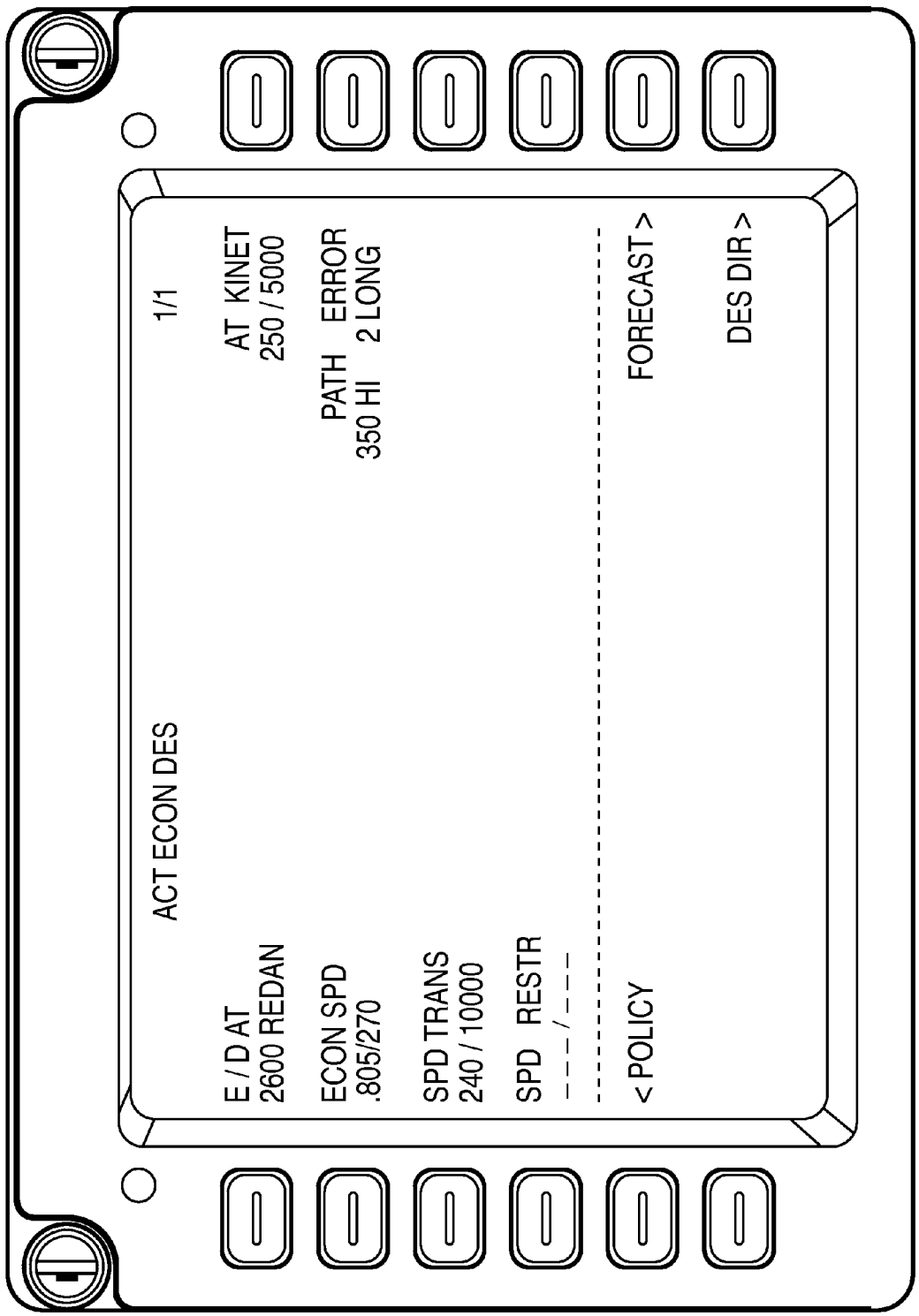
FIG. 16 is a diagrammatic illustration of an exemplary AFMC economy descent page accessible from the MCDU in accordance with the upgraded flight management system of the present invention as illustrated in FIG. 2.

Referring now to FIG. 16, the menu page can comprise a Descent Page for providing an interface to define the descent phase of flight, such as the economy values illustrated in FIG. 16. In such an instance, the legacy AFMC 105 (FIG. 2) can be configured to entries provided via the Descent Page to determine and commence descending at the top of decent point.

Figure 17:
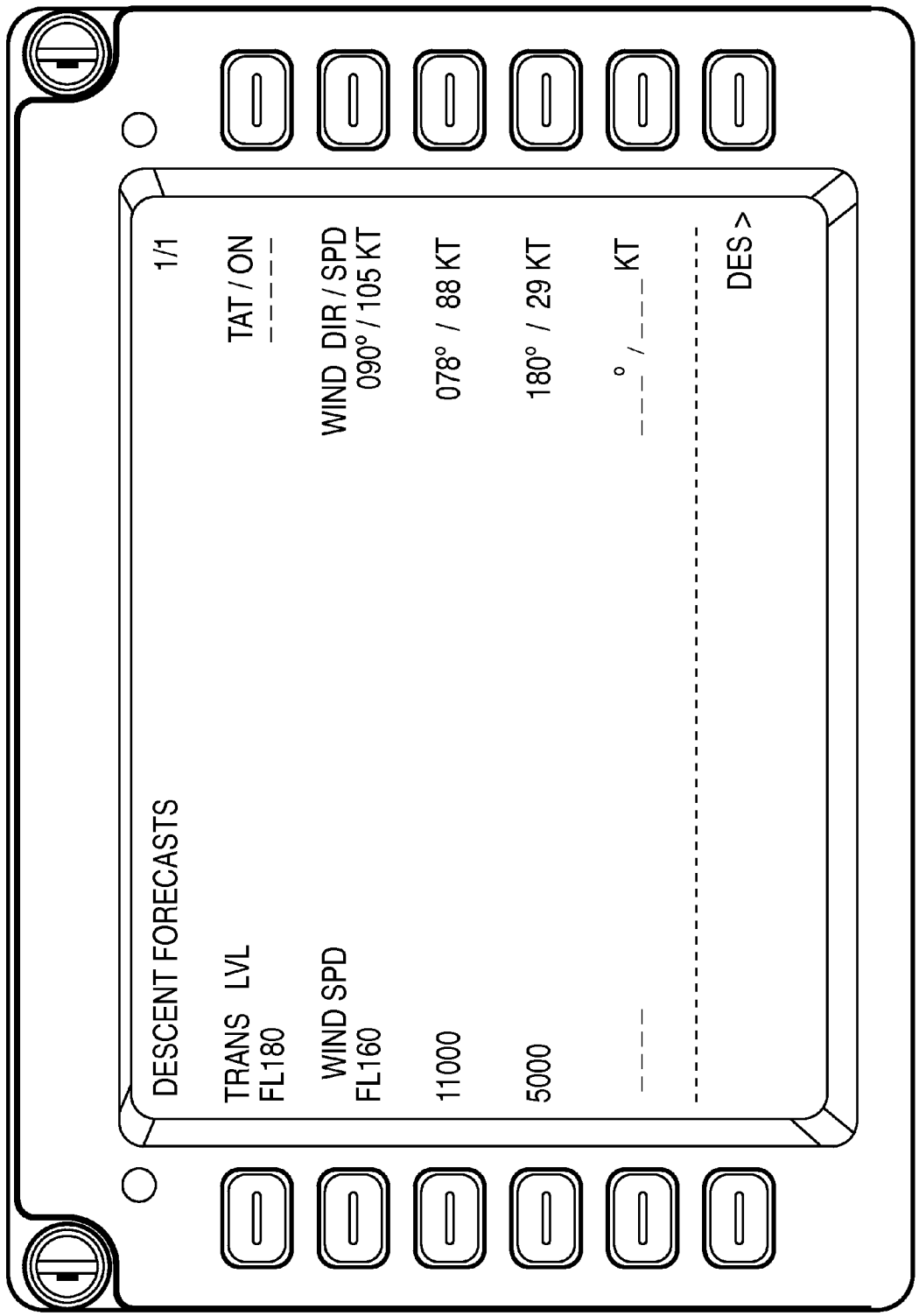
FIG. 17 is a diagrammatic illustration of an exemplary AFMC descent forecast page accessible from the descent page of FIG. 16 in accordance with the present invention in the upgraded flight management system of FIG. 2.

Referring now to FIG. 17, the menu page can comprise a Descent Forecast Page for providing an interface to define additional descent parameters (e.g., forecast winds, anti-icing, etc.).

Figure 4B:
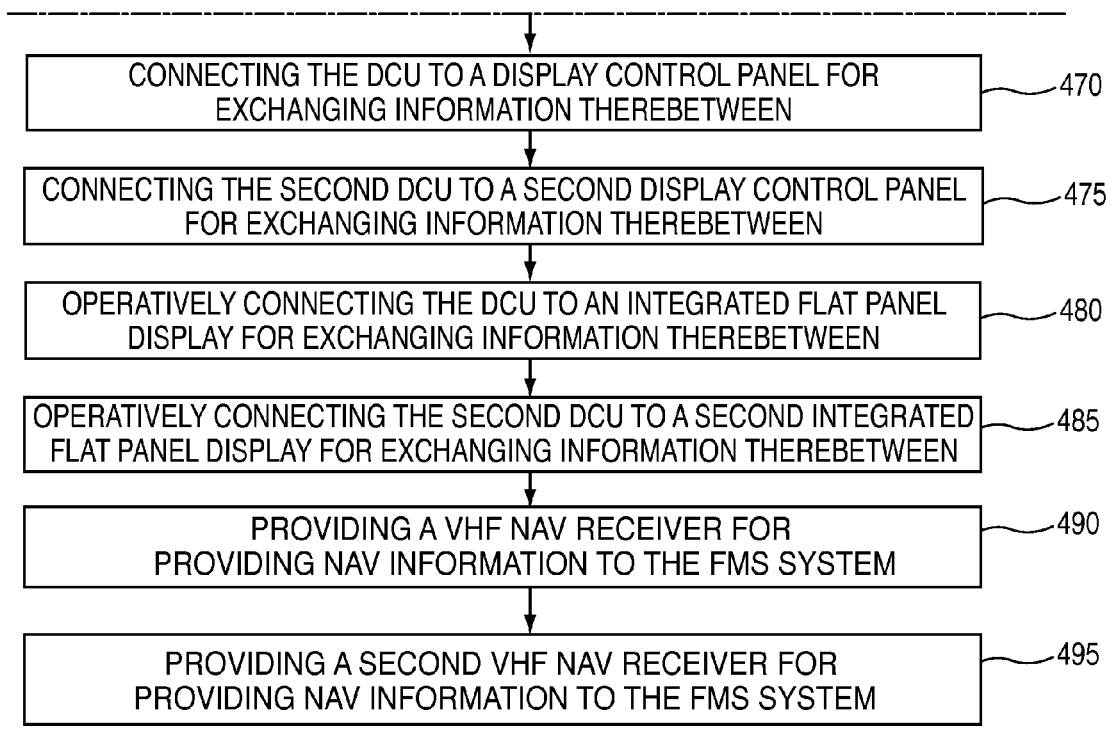
FIG. 4 is a representative flow chart illustrating a typical preferred method in accordance with the present invention for upgrading a preexisting flight management system, such as the flight management system of FIG. 1, to achieve the presently preferred embodiment illustrated in FIG. 2.

Returning back now to FIG. 4, FIG. 4 illustrates an exemplary flow chart of a method 400 of upgrading a preexisting FMS, such as FMS system 100 previously described, having a legacy AFMC 105 in order to provide increased functionality over the preexisting FMS 100 for enabling the upgraded preexisting FMS 200 to be capable of having at least increased navigation database storage capacity; and/or RNP, VNAV and RNAV capability utilizing a GPS based navigation solution and/or RTA capability while still enabling the legacy AFMC to exploit its aircraft performance capabilities throughout the flight of an aircraft 300 having the upgraded preexisting FMS 200 on board. The method 400 illustrated in FIG. 4 is merely intended to be exemplary and is not limited to the embodiments of the FMS system 200 presented herein. Method 400 can be employed in many different embodiments or examples not specifically depicted or described herein. In some embodiments, the activities, the procedures, and/or the processes of method 400 can be performed in the order presented. In other embodiments, the activities, the processes, and/or the procedures of method 400 can be performed in any other suitable order. In still other embodiments, one or more of the activities, the processes, and/or the procedures in method 400 can be combined or skipped. Thus, FIG. 4 is just an illustration of the various steps that may be preferably performed to achieve the presently preferred upgraded FMS system 200 of the present invention from the preexisting FMS system 100 originally provided on board the aircraft 300, keeping in mind that the steps need not be performed in any specific order as long as they ultimately result in the upgraded FMS system 200 of FIG. 2.

Of course any modifications may be made to the upgraded system 200 and method described herein as long as such modifications do not depart from the spirit and scope of the present invention as set forth herein in the specification and in the claims below.

What is claimed is:

1. In an upgraded preexisting flight management system (FMS) having increased functionality over a preexisting FMS, the preexisting FMS having a legacy advanced flight management computer (AFMC) having aircraft performance capabilities exploitable throughout a flight of an aircraft having the preexisting FMS on board the aircraft; an inertial reference unit (IRU), a central air data computer (CADC), a distance measuring equipment (DME) receiver, and a digital flight guidance computer (DFGC), the IRU, CADC, DME receiver and DFGC being connected to the legacy AFMC;

the improvement comprising a data concentrator unit, the CADC, IRU and DME receiver being connected to the data concentrator unit for providing input information thereto, the data concentrator unit and the legacy AFMC being operatively connected to each other for exchanging input and output information therebetween, the DFGC being connected to the data concentrator unit for receiving output information therefrom; and a global positioning system (GPS) receiver operatively connected to the data concentrator unit for providing input information thereto;

whereby the data concentrator unit is configured to:
combine the input information from the GPS receiver and the IRU in response to receiving input information from the GPS receiver and the IRU; or
in the event that no input information is received from the GPS receiver for a pre-determined amount of time, combine the input information from the IRU and the DME receiver, and
transmit combined input information to the AFMC, and the upgraded preexisting FMS is capable of at least increased navigation database storage capacity; as well as required navigation performance (RNP), vertical navigation (VNAV), area navigation (RNAV) and required time of arrival (RTA) capability utilizing a GPS based navigation solution, while still enabling the legacy AFMC to exploit its aircraft performance capabilities throughout the flight of an aircraft having the upgraded preexisting FMS on board.

2. An upgraded preexisting FMS in accordance with claim 1 further comprising a multipurpose control display unit (MCDU) operatively connected to the data concentrator unit and the legacy AFMC for exchanging information therebetween.

3. An upgraded preexisting FMS in accordance with claim 2 further comprising a display control panel operatively connected to the data concentrator unit for exchanging information therebetween.

4. An upgraded preexisting FMS in accordance with claim 3 further comprising an integrated flat panel display operatively connected to the data concentrator unit for exchanging information therebetween.

5. An upgraded preexisting FMS in accordance with claim 1 further comprising a display control panel operatively connected to the data concentrator unit for exchanging information therebetween.

6. An upgraded preexisting FMS in accordance with claim 5 further comprising an integrated flat panel display operatively connected to the data concentrator unit for exchanging information therebetween.

7. An upgraded preexisting FMS in accordance with claim 1 further comprising an integrated flat panel display operatively connected to the data concentrator unit for exchanging information therebetween.

8. An upgraded preexisting FMS in accordance with claim 1 further comprising a redundant system operatively connected to the legacy AFMC, the redundant system comprising a second IRU, a second CADC, a second DME receiver, a second DFGC, a second data concentrator unit, and a second global positioning system receiver.

9. An upgraded preexisting FMS in accordance with claim 8 wherein the second CADC, second IRU and second DME receiver are connected to the second data concentrator unit for providing redundant input information thereto, the second CADC being further connected to the legacy AFMC for providing redundant input information thereto, the second data concentrator unit and the legacy AFMC being operatively connected to each other for exchanging redundant input and output information therebetween, the second DFGC being connected to the second data concentrator unit for receiving output information therefrom, the second global positioning system receiver being operatively connected to the second data concentrator unit input; whereby the redundant system shares the legacy AFMC in the upgraded FMS.

10. An upgraded preexisting FMS in accordance with claim 9 further comprising a second multipurpose control display unit (MCDU) operatively connected to the second data concentrator unit and the legacy AFMC for exchanging information therebetween.

11. An upgraded preexisting FMS in accordance with claim 10 further comprising a second display control panel operatively connected to the second data concentrator unit for exchanging information therebetween.

12. An upgraded preexisting FMS in accordance with claim 11 further comprising a second integrated flat panel display operatively connected to the second data concentrator unit for exchanging information therebetween.

13. An upgraded preexisting FMS in accordance with claim 1 further comprising a very high frequency navigation (VHF NAV) receiver for providing NAV information to the upgraded preexisting FMS.

14. A method of upgrading a preexisting flight management system (FMS) having a legacy advanced flight management computer (AFMC) in order to provide increased functionality over the preexisting FMS for enabling the upgraded preexisting FMS to be capable of having at least increased navigation database storage capacity; as well as required navigation performance (RNP), vertical navigation (VNAV), area navigation (RNAV) and required time of arrival (RTA) capability utilizing a global positioning system (GPS) based navigation solution while still enabling the legacy AFMC to exploit its aircraft performance capabilities throughout the flight of an aircraft having the upgraded preexisting FMS on board, the preexisting FMS having at least a legacy AFMC, an inertial reference unit (IRU), a central air data computer (CADC), a distance measuring equipment (DME) receiver, a digital flight guidance computer (DFGC), and a legacy electrical flight information system (EFIS), the IRU, CADC, DME receiver and DFGC being connected to the legacy AFMC;

the method comprising the steps of replacing the legacy EFIS system with a data concentrator unit; connecting the CADC, IRU and DME receiver to the data concentrator unit for providing input information thereto; connecting the data concentrator unit and the legacy AFMC together for exchanging input and output information therebetween; connecting the DFGC to the data concentrator unit output for receiving output information therefrom; and adding a global positioning system receiver to the preexisting FMS and operatively connecting it to the data concentrator unit input, wherein the data concentrator unit is configured to:

combine the input information from the GPS receiver and the IRU in response to receiving input information from the GPS receiver and the IRU; or in the event that no input information is received from the GPS receiver for a pre-determined amount of time, combine the input information from the IRU and the DME receiver, and transmit combined input information to the AFMC.

15. A method of upgrading a preexisting FMS in accordance with claim 14 further comprising the step of operatively connecting a multipurpose control display unit (MCDU) to the data concentrator unit and the legacy AFMC for exchanging information therebetween.

16. A method of upgrading a preexisting FMS in accordance with claim 15 further comprising the step of connecting the data concentrator unit to a display control panel for exchanging information therebetween.

17. A method of upgrading a preexisting FMS in accordance with claim 16 further comprising the step of operatively connecting the data concentrator unit to an integrated flat panel display for exchanging information therebetween.

18. A method of upgrading a preexisting FMS in accordance with claim 14 further comprising the step of providing a very high frequency navigation (VHF NAV) receiver for providing NAV information to the FMS system.

* * * * *